US012289728B2

United States Patent
Cai et al.

(10) Patent No.: US 12,289,728 B2
(45) Date of Patent: Apr. 29, 2025

(54) COMMUNICATIONS METHOD AND APPARATUS

(71) Applicant: HUAWEI TECHNOLOGIES CO., LTD., Guangdong (CN)

(72) Inventors: Yu Cai, Beijing (CN); Hongyu Li, Shenzhen (CN); Haibo Xu, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 625 days.

(21) Appl. No.: 17/276,408

(22) PCT Filed: Sep. 10, 2019

(86) PCT No.: PCT/CN2019/105031
§ 371 (c)(1),
(2) Date: Mar. 15, 2021

(87) PCT Pub. No.: WO2020/052536
PCT Pub. Date: Mar. 19, 2020

(65) Prior Publication Data
US 2022/0078763 A1   Mar. 10, 2022

(30) Foreign Application Priority Data

Sep. 15, 2018   (CN) .......................... 201811077489.7

(51) Int. Cl.
*H04W 72/23*   (2023.01)
*H04W 72/0446*   (2023.01)

(52) U.S. Cl.
CPC ....... *H04W 72/23* (2023.01); *H04W 72/0446* (2013.01)

(58) Field of Classification Search
CPC ..................................................... H04W 72/23
See application file for complete search history.

(56) References Cited

U.S. PATENT DOCUMENTS

| 2012/0263093 A1 | 10/2012 | Roessel et al. |
| 2013/0230017 A1 | 9/2013 | Papasakellariou et al. |
| 2018/0132211 A1 | 5/2018 | Huang |

(Continued)

FOREIGN PATENT DOCUMENTS

| CN | 102256339 A | 11/2011 |
| CN | 105406951 A | 3/2016 |

(Continued)

OTHER PUBLICATIONS

Intel Corporation (To be changed to 3GPP RAN4), "Draft LS on BWP switching delay," 3GPP TSG RAN WG4 #86, R4-1803283, Athens, Greece, Feb. 26-Mar. 2, 2018, 2 pages.

(Continued)

*Primary Examiner* — Abdeltif Ajid
(74) *Attorney, Agent, or Firm* — Fish & Richardson P.C.

(57) ABSTRACT

Embodiments of this application relate to a communications method and apparatus. An example of the method includes: sending, by a user equipment (UE) to a network device, information used to indicate a first time domain offset and/or information used to indicate low power consumption; and receiving, by the UE, first information sent by the network device, where the first information is used by the UE to determine a first time domain resource allocation.

19 Claims, 11 Drawing Sheets

(56) References Cited

U.S. PATENT DOCUMENTS

| | | | | |
|---|---|---|---|---|
| 2020/0037348 | A1* | 1/2020 | Nam | H04W 72/20 |
| 2020/0053767 | A1* | 2/2020 | Bai | H04W 72/23 |
| 2020/0120642 | A1* | 4/2020 | Hwang | H04L 5/005 |
| 2021/0136808 | A1* | 5/2021 | Yang | H04L 5/001 |

FOREIGN PATENT DOCUMENTS

| | | | |
|---|---|---|---|
| CN | 106951736 | A | 7/2017 |
| CN | 106961736 | A | 7/2017 |
| CN | 107205279 | A | 9/2017 |
| CN | 107659994 | A | 2/2018 |
| CN | 107925855 | A | 4/2018 |
| CN | 108024375 | A | 5/2018 |
| CN | 108282275 | A | 7/2018 |
| JP | 2022501874 | A | 1/2022 |
| WO | 2009022309 | A2 | 2/2009 |
| WO | 2017121324 | A1 | 7/2017 |
| WO | 2017136592 | A1 | 8/2017 |

OTHER PUBLICATIONS

Office Action issued in Japanese Application No. 2021-513944 on Jun. 7, 2022, 10 pages (with English translation).

ZTE, "Remaining issue for BWP," 3GPP TSG RAN WG1 #93, R1-1806135, Busan, Korea, May 21-25, 2018, 7 pages.

3GPP TS 38.213 V15.2.0 (Jun. 2018), "3rd Generation Partnership Project; Technical Specification Group Radio Access Network; NR;Physical layer procedures for control(Release 15)," 99 pages.

3GPP TS 38.214 V15.2.0 (Jun. 2018), "3rd Generation Partnership Project; Technical Specification Group Radio Access Network;NR;Physical layer procedures for data (Release 15)," Jun. 2018, 95 pages.

3GPP TS 38.331 V15.2.1 (Jun. 2018), "3rd Generation Partnership Project; Technical Specification Group Radio Access Network;NR-;Radio Resource Control (RRC) protocol specification(Release 15)," Jun. 2018, 303 pages.

Extended European Search Report issued in European Application No. 19860058.7 on Sep. 1, 2021, 11 pages.

Huawei et al, "Remaining issues on simultaneous reception and transmission over CCs and BWPs," 3GPP TSG RAN WGI Meeting #93, R1-1805955, Busan, Korea, May 21-25, 2018, 5 pages.

MediaTek Inc. et al, "Cross-Slot Scheduling for UE Power Saving," 3GPP TSG RAN WG1 NR Ad-Hoc#2, R1-1710838, Qingdao, P.R. China, Jun. 27-30, 2017, 4 pages.

NTT Docomo, Inc., "Maintenance for carrier aggregation and bandwidth parts," 3GPP TSG RAN WG1 Meeting #94, R1-1809144, Gothenburg, Sweden, Aug. 20-24, 2018, 21 pages.

Office Action issued in Chinese Application No. 201811077489.7 on Jul. 22, 2020, 12 pages (with English translation).

PCT International Search Report and Written Opinion issued in International Application No. PCT/CN2019/105031 on Dec. 16, 2019, 20 pages (with English translation).

Qualcomm Incorporated, "Views on UE power saving," 3GPP TSG RAN WG1 Meeting #94, R1-1809462, Gothenburg, Sweden, Aug. 20-24, 2018, 11 pages.

Samsung, "Corrections on DL/UL Resource Allocation", 3GPP TSG RAN WGI Meeting AH1801, R1-1800451, Vancouver, Canada, Jan. 22-26, 2018, 11 pages.

Samsung, "DL/UL Time Resource Allocation",3GPP TSG RAN WG1 Meeting #90, R1-1713636, Prague, Czechia Aug. 21-25, 2017, 4 pages.

Qualcomm Incorporated, "Remaining Issues on BWP," 3GPP TSG RAN WG1 #93, R1-1807368, Busan, Korea, May 21-25, 2018, 19 pages.

Vivo, "Other aspects on bandwidth Parts," 3GPP TSG RAN WG1 Meeting 91, R1-1719800, Reno, USA, Nov. 27-Dec. 1, 2017, 7 pages.

MediaTek Inc., "Summary of Bandwidth Part Remaining Issues," 3GPP TSG RAN WG1 Meeting AH 1801, R1-1801158, Vancouver, Canada, Jan. 22-26, 2018, 21 pages.

Office Action in Korean Appln. No. 10-2021-7008288, mailed on Mar. 8, 2024, 11 pages (with English translation).

* cited by examiner

COMMUNICATIONS METHOD AND APPARATUS

CROSS-REFERENCE TO RELATED APPLICATIONS

This application is a National Stage of International Application No. PCT/CN2019/105031, filed on Sep. 10, 2019, which claims priority to Chinese Patent Application No. 201811077489.7, filed on Sep. 15, 2018, both of which are hereby incorporated by reference in their entireties.

TECHNICAL FIELD

Embodiments of this application relate to the field of communications technologies, and in particular, to a communications method and apparatus.

BACKGROUND

After a terminal establishes a connection to a base station, the terminal may need to transmit data to the base station. The base station uses a physical downlink shared channel (Physical Downlink Shared Channel, PDSCH) to carry downlink data sent by the base station to the terminal. The base station sends, to the terminal, downlink control information (Downlink Control Information, DCI) used to schedule the PDSCH. The DCI includes a time domain resource assignment (Time domain resource assignment) field, and the time domain resource assignment field is used by the terminal to determine a position of a time domain resource of the PDSCH.

In the prior art, the terminal monitors the DCI to receive the PDSCH sent by the base station. The terminal does not know an offset between the scheduled PDSCH and the DCI before obtaining the DCI through decoding. Therefore, the terminal may start to buffer data from an earliest possible start position of the time domain resource of the PDSCH. The terminal may determine the earliest possible start position of the time domain resource of the PDSCH based on a determined PDSCH time domain resource allocation table/list (PDSCH-Allocation List or PDSCH-TimeDomainResourceAllocationList).

However, it is assumed that an interval between the earliest possible start position of the time domain resource of the PDSCH and a time domain position of the DCI used to schedule the PDSCH is relatively short (for example, shorter than a time period in which the terminal obtains the DCI through decoding). In this case, if the terminal starts to buffer data from the earliest possible start position of the time domain resource of the PDSCH, but the base station does not send the PDSCH to the terminal, the terminal buffers some data in vain, and consequently a power consumption waste may be caused, as shown in FIG. 1(a).

SUMMARY

Embodiments of this application provide a communications method and apparatus, to resolve a prior-art problem of a power consumption waste of a terminal.

To resolve the foregoing technical problem, the embodiments of this application provide the following technical solutions:

According to a first aspect, an embodiment of this application provides a communications method, including: sending, by a terminal to a network device, information used to indicate a first time domain offset and/or information used to indicate low power consumption; and receiving, by the terminal, first information sent by the network device, where the first information is used by the terminal to determine a first time domain resource allocation.

According to the communications method provided in this embodiment of this application, a time domain resource allocation is usually used to indicate a start position of a time domain resource of a downlink data channel. Therefore, the terminal sends, to the network device, the information used to indicate the first time domain offset and/or the information used to indicate low power consumption, so that there is a relatively long interval between a time domain position of DCI and a start position of a time domain resource that is included/indicated in the first time domain resource allocation allocated by the network device to the terminal or the first time domain resource allocation that the network device indicates the terminal to determine. In actual implementation of the terminal, the terminal may disable different modules in a time period after the time domain position of the DCI and before the start position of the time domain resource of the downlink data channel based on a value of the interval between the time domain position of the DCI and the start position of the time domain resource of the downlink data channel. More disabled modules indicate lower power consumption of the terminal. Usually, a longer time domain interval between the start position of the time domain resource of the downlink data channel and the time domain position of the DCI indicates lower power consumption of the terminal in a time period between the start position of the time domain resource of the downlink data channel and the time domain position of the DCI.

With reference to the first aspect, in a first possible implementation of the first aspect, the first time domain offset may be a minimum time domain offset expected by the terminal, or the first time domain offset may be a time domain offset increment expected by the terminal, or the first time domain offset may be a maximum time domain offset expected by the terminal.

With reference to the first aspect or the first possible implementation of the first aspect, in a second possible implementation of the first aspect, the first information includes the first time domain resource allocation, or the first information is specifically used to indicate the first time domain resource allocation; and the method provided in this embodiment of this application further includes: determining, by the terminal, the first time domain resource allocation from the first information.

With reference to the first aspect or the first possible implementation of the first aspect, in a third possible implementation of the first aspect, the first information is specifically used to indicate the terminal to hand over to a first frequency domain resource, and the first time domain resource allocation is a time domain resource allocation corresponding to the first frequency domain resource. In other words, after the terminal receives the first information, the terminal determines, based on the first information, the time domain resource allocation corresponding to the first frequency domain resource as the first time domain resource allocation. In this way, the terminal can be indicated to hand over to a frequency domain resource, and the terminal can determine the first time domain resource allocation.

With reference to the first aspect or the first possible implementation of the first aspect, in a fourth possible implementation of the first aspect, when the terminal has a second time domain resource allocation, the first time domain resource allocation is determined based on the second time domain resource allocation and a second time domain offset. In this way, the terminal determines the first time domain resource allocation based on the existing second time domain resource allocation, so that there is a relatively long interval between the start position of the time domain resource that is indicated by the first time domain resource allocation and the time domain position of the DCI.

With reference to the fourth possible implementation of the first aspect, in a fifth possible implementation of the first aspect, a third time domain offset indicated by the first time domain resource allocation is obtained based on a fourth time domain offset and the second time domain offset, and the fourth time domain offset is a time domain offset indicated by the second time domain resource allocation. In this way, the terminal obtains the third time domain offset by adding the second time domain offset to the fourth time domain offset or subtracting the second time domain offset from the fourth time domain offset.

With reference to the fifth possible implementation of the first aspect, in a sixth possible implementation of the first aspect, the third time domain offset is the fourth time domain offset plus the second time domain offset, or a minimum value of the third time domain offset is the second time domain offset, or the third time domain offset is the fourth time domain offset plus the second time domain offset minus a minimum time domain offset indicated by the second time domain resource allocation.

With reference to any one of the first aspect to the fifth possible implementation of the first aspect, in a seventh possible implementation of the first aspect, a minimum value of the third time domain offset is the minimum time domain offset expected by the terminal.

With reference to any one of the first aspect to the fifth possible implementation of the first aspect, in an eighth possible implementation of the first aspect, the third time domain offset is the fourth time domain offset minus the second time domain offset, or a maximum value of the third time domain offset is the second time domain offset.

With reference to any one of the first aspect to the fifth possible implementation of the first aspect, in a ninth possible implementation of the first aspect, a maximum value of the third time domain offset is the maximum time domain offset expected by the terminal.

With reference to the first aspect or the first possible implementation of the first aspect, in a tenth possible implementation of the first aspect, the first time domain resource allocation includes a target time domain resource allocation in a second time domain resource allocation.

In an example, a fifth time domain offset indicated by the target time domain resource allocation is greater than or equal to a second time domain offset. This is applicable to a case in which the terminal expects to reduce power consumption. In this case, the second time domain offset may be the minimum time domain offset expected by the terminal.

In an example, a fifth time domain offset indicated by the target time domain resource allocation is less than or equal to a second time domain offset. This is applicable to a case in which the terminal expects to reduce a scheduling delay. In this case, the second time domain offset may be the maximum time domain offset expected by the terminal.

In an example, a fifth time domain offset indicated by the target time domain resource allocation is less than or equal to the maximum time domain offset expected by the terminal, and is greater than or equal to the minimum time domain offset expected by the terminal. In this way, power consumption can be reduced, and a scheduling delay can fall within a proper range.

With reference to any one of the first aspect to the tenth possible implementation of the first aspect, in an eleventh possible implementation of the first aspect, the third time domain offset indicated by the first time domain resource allocation is greater than or equal to the first time domain offset; or when the terminal has the second time domain resource allocation, the third time domain offset is greater than or equal to a sum of the first time domain offset and the fourth time domain offset.

With reference to any one of the first aspect to the tenth possible implementation of the first aspect, in a twelfth possible implementation of the first aspect, the third time domain offset indicated by the first time domain resource allocation is less than or equal to the first time domain offset; or when the terminal has the second time domain resource allocation, the third time domain offset is less than or equal to a sum of the first time domain offset and the fourth time domain offset.

With reference to any one of the first aspect to the twelfth possible implementation of the first aspect, in a thirteenth possible implementation of the first aspect, the second time domain offset is a predefined time domain offset, or the second time domain offset is a time domain offset indicated by the first information, or the second time domain offset is the first time domain offset.

With reference to any one of the first aspect to the thirteenth possible implementation of the first aspect, in a fourteenth possible implementation of the first aspect, the method provided in this embodiment of this application further includes: receiving, by the terminal based on the first time domain resource allocation, a downlink data channel sent by the network device. The first time domain resource allocation is determined based on the information that is sent by the terminal and that is used to indicate low power consumption and/or the first time domain offset. Therefore, if the third time domain offset indicated by the first time domain resource allocation is greater than or equal to the minimum time domain offset expected by the terminal, power consumption of the terminal can be reduced. The first time domain resource allocation is determined based on information that is sent by the terminal and that is used to indicate a low scheduling delay and/or the first time domain offset. Therefore, if the third time domain offset indicated by the first time domain resource allocation is less than or equal to the maximum time domain offset expected by the terminal, a scheduling delay can be reduced.

When the terminal has two or more time domain resource allocations (the first time domain resource allocation and the second time domain resource allocation), the terminal may further implement, for example, any step performed by the terminal in the following third aspect. Details are not described herein.

According to a second aspect, an embodiment of this application provides a communications method, including: receiving, by a network device, information used to indicate a first time domain offset and/or information used to indicate low power consumption that are/is sent by a terminal; and sending, by the network device, first information to the terminal, where the first information is used by the terminal to determine a first time domain resource allocation.

With reference to the second aspect, in a first possible implementation of the second aspect, the first information includes the first time domain resource allocation, or the first information is specifically used to indicate the first time domain resource allocation.

With reference to the second aspect or the first possible implementation of the second aspect, in a second possible implementation of the second aspect, when the network device has a second time domain resource allocation, the method provided in this embodiment of this application further includes; determining, by the network device, the first time domain resource allocation based on the second time domain resource allocation and a second time domain offset.

With reference to any one of the second aspect to the second possible implementation of the second aspect, in a third possible implementation of the second aspect, the second time domain offset is the first time domain offset, or the second time domain offset is a predefined time domain offset.

With reference to the second possible implementation or the third possible implementation of the second aspect, in a fourth possible implementation of the second aspect, a third time domain offset is obtained based on a fourth time domain offset and the second time domain offset, the fourth time domain offset is a time domain offset indicated by the second time domain resource allocation, and the third time domain offset is a time domain offset indicated by the second time domain resource allocation.

With reference to the fourth possible implementation of the second aspect, in a fifth possible implementation of the second aspect, the third time domain offset is the fourth time domain offset plus the second time domain offset, or a minimum value of the third time domain offset is the second time domain offset, or the third time domain offset is the fourth time domain offset plus the second time domain offset minus a minimum time domain offset indicated by the second time domain resource allocation.

With reference to the second aspect or the first possible implementation of the second aspect, in a sixth possible implementation of the second aspect, the first time domain resource allocation includes a target time domain resource allocation in a second time domain resource allocation.

In an example, a fifth time domain offset indicated by the target time domain resource allocation is greater than or equal to a second time domain offset. This is applicable to a case in which a time domain offset expected by the terminal is greater than or equal to a minimum time domain offset expected by the terminal, to reduce power consumption.

In an example, a fifth time domain offset indicated by the target time domain resource allocation is less than or equal to a second time domain offset. This is applicable to a case in which a time domain offset expected by the terminal is less than or equal to a maximum time domain offset expected by the terminal, to reduce a scheduling delay.

In an example, a fifth time domain offset indicated by the target time domain resource allocation is less than or equal to a maximum time domain offset expected by the terminal, and is greater than or equal to a minimum time domain offset expected by the terminal. In this way, power consumption can be reduced, and a scheduling delay can fall within a proper range.

With reference to the second aspect or the first possible implementation of the second aspect, in a seventh possible implementation of the second aspect, the first information is specifically used to indicate the terminal to hand over to a first frequency domain resource, and the first frequency domain resource corresponds to the first time domain resource allocation.

With reference to the second aspect or the first possible implementation of the second aspect, in an eighth possible implementation of the second aspect, the first information is specifically used to indicate the terminal to determine the first time domain resource allocation.

With reference to any one of the second aspect to the eighth possible implementation of the second aspect, in a ninth possible implementation of the second aspect, the third time domain offset indicated by the first time domain resource allocation is greater than or equal to the first time domain offset. This is applicable to a case in which the first time domain offset is the minimum time domain offset expected by the terminal.

With reference to any one of the second aspect to the eighth possible implementation of the second aspect, in a tenth possible implementation of the second aspect, when the terminal has the second time domain resource allocation, the third time domain offset is greater than or equal to a sum of the first time domain offset and the fourth time domain offset. This is applicable to a case in which the first time domain offset is a time domain offset increment expected by the terminal, and the finally obtained third time domain offset is greater than or equal to the minimum time domain offset expected by the terminal, to reduce power consumption of the terminal.

With reference to any one of the second aspect to the eighth possible implementation of the second aspect, in an eleventh possible implementation of the second aspect, the third time domain offset indicated by the first time domain resource allocation is less than or equal to the first time domain offset. This is applicable to a case in which the first time domain offset is the maximum time domain offset expected by the terminal.

With reference to any one of the second aspect to the eighth possible implementation of the second aspect, in a twelfth possible implementation of the second aspect, when the terminal has the second time domain resource allocation, the third time domain offset is less than or equal to a sum of the first time domain offset and the fourth time domain offset. This is applicable to a case in which the first time domain offset is a time domain offset increment expected by the terminal, and the finally obtained third time domain offset is less than or equal to the maximum time domain offset expected by the terminal.

With reference to any one of the second aspect to the twelfth possible implementation of the second aspect, in a thirteenth possible implementation of the second aspect, the method provided in this embodiment of this application further includes: sending, by the network device, a downlink data channel to the terminal based on the first time domain resource allocation.

It should be noted that when the terminal has two or more second time domain resource allocations (for example, the first time domain resource allocation and the second time domain resource allocation), the network device provided in this embodiment of this application may further perform steps performed by the network device in the fourth aspect or any possible implementation of the fourth aspect. For details, refer to descriptions in the following fourth aspect. Details are not described herein.

According to a third aspect, an embodiment of this application provides a data channel receiving method, including: obtaining, by a terminal, a first time domain resource allocation and a second time domain resource allocation, where the first time domain resource allocation is different from the second time domain resource allocation; when a first condition is met, if the terminal receives first downlink control information DCI sent by a network device, receiving, by the terminal based on the first time domain resource allocation, a downlink data channel scheduled by the first DCI, where the first condition includes: a first timer is not running; and when a second condition is met, if the terminal receives second DCI sent by the network device, receiving, by the terminal based on the second time domain resource allocation, a downlink data channel scheduled by the second DCI, where the second condition includes: the first timer is running.

With reference to the third aspect, in a first possible implementation of the third aspect, the first timer is used to determine a time length for which the terminal monitors a downlink control channel after receiving the downlink control channel.

With reference to the third aspect or the first possible implementation of the third aspect, in a second possible implementation of the third aspect, the terminal starts or restarts the first timer when one of the following conditions is met: the terminal receives a downlink control channel; the terminal receives a downlink control channel indicating data transmission; and the terminal receives a downlink control channel indicating initial transmission, or a second timer is started or restarted, where the second timer is used to determine a time length for which the terminal monitors the downlink control channel indicating initial transmission after receiving the downlink control channel.

With reference to any one of the third aspect to the second possible implementation of the third aspect, in a third possible implementation of the third aspect, the first condition further includes: a third timer is running, and the third timer is used to determine a time length for which the terminal monitors a downlink control channel in a discontinuous reception DRX cycle.

With reference to any one of the third aspect to the third possible implementation of the third aspect, in a fourth possible implementation of the third aspect, the first condition further includes one or more of the following cases: a downlink retransmission timer is not running; an uplink retransmission timer is not running; a contention resolution timer is not running; a scheduling request sent by the terminal is not pending; and the terminal receives a downlink control channel indicating initial transmission after successfully receiving a random access response RAR, where the downlink control channel indicating initial transmission is scrambled by using a first identifier, the RAR is a response to a target random access preamble, the target random access preamble is not a contention-based random access preamble, and the first identifier is used to identify the terminal in a cell accessed by the terminal in a random access procedure.

With reference to any one of the third aspect to the fourth possible implementation of the third aspect, in a fifth possible implementation of the third aspect, the method provided in this embodiment of this application further includes: when the terminal determines that a third condition is met, receiving, by the terminal based on the second time domain resource allocation, the downlink data channel scheduled by the second DCI, where the third condition includes one or more of the following: the downlink retransmission timer is running; the uplink retransmission timer is running; the contention resolution timer is running; the scheduling request sent by the terminal is pending; and the terminal does not receive the downlink control channel indicating initial transmission after successfully receiving the random access response RAR, where the downlink control channel indicating initial transmission is scrambled by using the first identifier, the RAR is a response to the target random access preamble, the target random access preamble is not a contention-based random access preamble, and the first identifier is used to identify the terminal in the cell accessed by the terminal in the random access procedure.

It should be noted that the terminal described in the third aspect may further perform the steps performed by the terminal in the first aspect or any possible implementation of the first aspect, to obtain the first time domain resource allocation and the second time domain resource allocation.

According to a fourth aspect, an embodiment of this application provides a data channel sending method, including: when a first condition is met, sending, by a network device, first downlink control information DCI to a terminal, and sending, by the network device to the terminal based on a first time domain resource allocation, a downlink data channel scheduled by the first DCI, where the first condition includes: a first timer is not running; and when a second condition is met, sending, by the network device, second DCI to the terminal, and sending, by the network device to the terminal based on a second time domain resource allocation, a downlink data channel scheduled by the second DCI, where the second condition includes: the first timer is running.

With reference to the fourth aspect, in a first possible implementation of the fourth aspect, the first timer is used to determine a time length for which the terminal monitors a downlink control channel after receiving the downlink control channel.

With reference to the fourth aspect or the first possible implementation of the fourth aspect, in a second possible implementation of the fourth aspect, the first condition further includes: a third timer is running, and the third timer is used to determine a time length for which the terminal monitors a downlink control channel in a discontinuous reception DRX cycle.

With reference to any one of the fourth aspect to the second possible implementation of the fourth aspect, in a third possible implementation of the fourth aspect, the first condition further includes one or more of the following cases: a downlink retransmission timer is not running; an uplink retransmission timer is not running; a contention resolution timer is not running; a scheduling request sent by the terminal is not pending; and the terminal receives a downlink control channel indicating initial transmission after successfully receiving a RAR, where the downlink control channel indicating initial transmission is scrambled by using a first identifier, the RAR is a response to a target random access preamble, the target random access preamble is not a contention-based random access preamble, and the first identifier is used to identify the terminal in a cell accessed by the terminal in a random access procedure.

With reference to any one of the fourth aspect to the third possible implementation of the fourth aspect, in a fourth possible implementation of the fourth aspect, the method provided in this embodiment of this application further includes: when a third condition is met, sending, by the network device to the terminal based on the second time domain resource allocation, the downlink data channel scheduled by the second DCI, where the third condition includes one or more of the following: the downlink retransmission timer is running; the uplink retransmission timer is running; the contention resolution timer is running; the scheduling request sent by the terminal is pending; and the terminal does not receive the downlink control channel indicating initial transmission after successfully receiving the RAR, where the downlink control channel indicating initial transmission is scrambled by using the first identifier, the RAR is a response to the target random access preamble, the target random access preamble is not a contention-based random access preamble, and the first identifier is used to identify the terminal in the cell accessed by the terminal in the random access procedure.

According to a fifth aspect, an embodiment of this application provides a communications apparatus. The communications apparatus may implement the method described in the first aspect or any possible implementation of the first aspect, and therefore may also achieve the beneficial effects in the first aspect or any possible implementation of the first aspect. The communications apparatus may be a terminal, or may be an apparatus that may support the terminal in implementing the method in the first aspect or any possible implementation of the first aspect, for example, a chip applied to the terminal. The communications apparatus may implement the foregoing method by using software or hardware, or by executing corresponding software by hardware.

In an example, the communications apparatus is a terminal or a chip applied to the terminal. The communications apparatus includes a sending unit, configured to send, to a network device, information used to indicate a first time domain offset and/or information used to indicate low power consumption; and a receiving unit, configured to receive first information that is sent by the network device and that is used by the terminal to determine a first time domain resource allocation.

With reference to the fifth aspect, in a first possible implementation of the fifth aspect, the first information includes the first time domain resource allocation, or the first information is specifically used to indicate the first time domain resource allocation.

With reference to the fifth aspect, in a second possible implementation of the fifth aspect, the first information is specifically used to indicate the terminal to hand over to a first frequency domain resource, and the first time domain resource allocation is a time domain resource allocation corresponding to the first frequency domain resource.

With reference to the fifth aspect, in a third possible implementation of the fifth aspect, when the first information is specifically used to indicate the terminal to determine the first time domain resource allocation, the first time domain resource allocation is determined by the terminal based on a second time domain offset and a second time domain resource allocation in the terminal.

With reference to the fifth aspect or the second possible implementation of the fifth aspect, in a fourth possible implementation of the fifth aspect, a third time domain offset indicated by the first time domain resource allocation is obtained based on a fourth time domain offset and the second time domain offset, and the fourth time domain offset is a time domain offset indicated by the second time domain resource allocation.

With reference to the fourth possible implementation of the fifth aspect, in a fifth possible implementation of the fifth aspect, the third time domain offset is the fourth time domain offset plus the second time domain offset; or a minimum value of the third time domain offset is the second time domain offset; or the third time domain offset is the fourth time domain offset plus the second time domain offset minus a minimum time domain offset indicated by the second time domain resource allocation.

With reference to the fifth aspect, in a sixth possible implementation of the fifth aspect, the first time domain resource allocation includes a target time domain resource allocation in a second time domain resource allocation.

In an example, a fifth time domain offset indicated by the target time domain resource allocation is greater than or equal to a second time domain offset.

In an example, a fifth time domain offset indicated by the target time domain resource allocation is less than or equal to a second time domain offset.

In an example, a fifth time domain offset indicated by the target time domain resource allocation is less than or equal to a maximum time domain offset expected by the terminal, and is greater than or equal to a minimum time domain offset expected by the terminal.

With reference to any one of the fifth aspect to the sixth possible implementation of the fifth aspect, in a seventh possible implementation of the fifth aspect, the second time domain offset is a predefined time domain offset, or the second time domain offset is a time domain offset indicated by the first information, or the second time domain offset is the first time domain offset.

With reference to any one of the fifth aspect to the seventh possible implementation of the fifth aspect, in an eighth possible implementation of the fifth aspect, the third time domain offset indicated by the first time domain resource allocation is greater than or equal to the first time domain offset; or when the terminal has the second time domain resource allocation, the third time domain offset is greater than or equal to a sum of the first time domain offset and the fourth time domain offset.

With reference to any one of the fifth aspect to the eighth possible implementation of the fifth aspect, in a ninth possible implementation of the fifth aspect, the third time domain offset indicated by the first time domain resource allocation is less than or equal to the first time domain offset; or when the terminal has the second time domain resource allocation, the third time domain offset is less than or equal to a sum of the first time domain offset and the fourth time domain offset.

According to a sixth aspect, an embodiment of this application further provides a communications apparatus. The communications apparatus may be a terminal or a chip applied to the terminal. The communications apparatus includes a processor and an interface circuit. The interface circuit is configured to support the communications apparatus in performing the message/data receiving and sending steps on the communications apparatus side described in the first aspect or any possible implementation of the first aspect. The processor is configured to support the communications apparatus in performing the message/data processing step on the communications apparatus side described in the first aspect or any possible implementation of the first aspect. For specific corresponding steps, refer to the descriptions in the first aspect or any possible implementation of the first aspect. Details are not described herein again.

The interface circuit is configured to send, to a network device, information used to indicate a first time domain offset and/or information used to indicate low power consumption. The interface circuit is configured to receive first information that is sent by the network device and that is used by the terminal to determine a first time domain resource allocation.

With reference to the sixth aspect, in a first possible implementation of the sixth aspect, the first information includes the first time domain resource allocation, or the first information is specifically used to indicate the first time domain resource allocation.

With reference to the sixth aspect, in a second possible implementation of the sixth aspect, the first information is specifically used to indicate the terminal to hand over to a first frequency domain resource, and the first time domain resource allocation is a time domain resource allocation corresponding to the first frequency domain resource.

With reference to the sixth aspect, in a third possible implementation of the sixth aspect, the first information is specifically used to indicate the terminal to determine the first time domain resource allocation, and when the terminal has a second time domain resource allocation, the first time domain resource allocation is determined based on the second time domain resource allocation and a second time domain offset.

With reference to the sixth aspect or the third possible implementation of the sixth aspect, in a fourth possible implementation of the sixth aspect, a third time domain offset indicated by the first time domain resource allocation is obtained based on a fourth time domain offset and the second time domain offset, and the fourth time domain offset is a time domain offset indicated by the second time domain resource allocation.

With reference to the fourth possible implementation of the sixth aspect, in a fifth possible implementation of the sixth aspect, the third time domain offset is the fourth time domain offset plus the second time domain offset; or a minimum value of the third time domain offset is the second time domain offset; or the third time domain offset is the fourth time domain offset plus the second time domain offset minus a minimum time domain offset indicated by the second time domain resource allocation.

With reference to the sixth aspect or the third possible implementation of the sixth aspect, in a sixth possible implementation of the sixth aspect, the first time domain resource allocation includes a target time domain resource allocation in the second time domain resource allocation, and a fifth time domain offset indicated by the target time domain resource allocation is greater than or equal to the second time domain offset.

With reference to the sixth aspect or the third possible implementation of the sixth aspect, in a seventh possible implementation of the sixth aspect, the first time domain resource allocation includes a target time domain resource allocation in the second time domain resource allocation, and a fifth time domain offset indicated by the target time domain resource allocation is less than or equal to the second time domain offset.

With reference to the sixth aspect or the third possible implementation of the sixth aspect, in an eighth possible implementation of the sixth aspect, the first time domain resource allocation includes a target time domain resource allocation in the second time domain resource allocation, and a fifth time domain offset indicated by the target time domain resource allocation is less than or equal to a maximum time domain offset expected by the terminal, and is greater than or equal to a minimum time domain offset expected by the terminal.

With reference to any one of the sixth aspect to the eighth possible implementation of the sixth aspect, in a ninth possible implementation of the sixth aspect, the second time domain offset is a predefined time domain offset, or the second time domain offset is a time domain offset indicated by the first information, or the second time domain offset is the first time domain offset.

With reference to any one of the sixth aspect to the ninth possible implementation of the sixth aspect, in a tenth possible implementation of the sixth aspect, the third time domain offset indicated by the first time domain resource allocation is greater than or equal to the first time domain offset; or when the terminal has the second time domain resource allocation, the third time domain offset is greater than or equal to a sum of the first time domain offset and the fourth time domain offset.

With reference to any one of the sixth aspect to the ninth possible implementation of the sixth aspect, in an eleventh possible implementation of the sixth aspect, the third time domain offset indicated by the first time domain resource allocation is less than or equal to the first time domain offset; or when the terminal has the second time domain resource allocation, the third time domain offset is less than or equal to a sum of the first time domain offset and the fourth time domain offset.

With reference to any one of the sixth aspect to the eleventh possible implementation of the sixth aspect, in a twelfth possible implementation of the sixth aspect, the interface circuit is further configured to receive, based on the first time domain resource allocation, a downlink data channel sent by the network device.

It should be noted that when the communications apparatus/network device has two or more time domain resource allocations (for example, the first time domain resource allocation and the second time domain resource allocation), for a manner in which the communications apparatus receives a downlink data channel by using a time domain resource allocation in different cases, refer to the steps performed by the communications apparatus in any possible implementation of the fourth aspect. Details are not described herein again.

According to a seventh aspect, an embodiment of this application provides a communications apparatus. The communications apparatus may implement the method described in the second aspect or any possible implementation of the second aspect, and therefore may also achieve the beneficial effects in the second aspect or any possible implementation of the second aspect. The communications apparatus may be a network device, or may be an apparatus that may support the network device in implementing the method in the second aspect or any possible implementation of the second aspect, for example, a chip applied to the communications apparatus. The communications apparatus may implement the foregoing method by using software or hardware, or by executing corresponding software by hardware.

In an example, the communications apparatus is a network device or a chip applied to the network device. The communications apparatus includes: a receiving unit, configured to receive information used to indicate a first time domain offset and/or information used to indicate low power consumption that are/is sent by a terminal; and a sending unit, configured to send first information to the terminal, where the first information is used by the terminal to determine a first time domain resource allocation.

With reference to the seventh aspect, in a first possible implementation of the seventh aspect, the first information includes the first time domain resource allocation, or the first information is specifically used to indicate the first time domain resource allocation.

With reference to the seventh aspect or the first possible implementation of the seventh aspect, in a second possible implementation of the seventh aspect, when the communications apparatus has a second time domain resource allocation, the first time domain resource allocation is determined by the network device based on the second time domain resource allocation and a second time domain offset.

With reference to the second possible implementation of the seventh aspect, in a third possible implementation of the seventh aspect, a third time domain offset is obtained based on a fourth time domain offset and the second time domain offset, and the fourth time domain offset is a time domain offset indicated by the second time domain resource allocation.

With reference to the third possible implementation of the seventh aspect, in a fourth possible implementation of the seventh aspect, the third time domain offset is the fourth time domain offset plus the second time domain offset, or a minimum value of the third time domain offset is the second time domain offset; or the third time domain offset is the fourth time domain offset plus the second time domain offset minus a minimum time domain offset indicated by the second time domain resource allocation.

With reference to the third possible implementation of the seventh aspect, in a fifth possible implementation of the seventh aspect, the third time domain offset is the fourth time domain offset minus the second time domain offset; or a maximum value of the third time domain offset is the second time domain offset.

With reference to the seventh aspect or the second possible implementation of the seventh aspect, in a sixth possible implementation of the seventh aspect, the first time domain resource allocation includes a target time domain resource allocation in the second time domain resource allocation, and a fifth time domain offset indicated by the target time domain resource allocation is greater than or equal to the second time domain offset.

With reference to the seventh aspect or the second possible implementation of the seventh aspect, in a seventh possible implementation of the seventh aspect, the first time domain resource allocation includes a target time domain resource allocation in the second time domain resource allocation, and a fifth time domain offset indicated by the target time domain resource allocation is less than or equal to the second time domain offset.

With reference to the seventh aspect or the second possible implementation of the seventh aspect, in an eighth possible implementation of the seventh aspect, the first time domain resource allocation includes a target time domain resource allocation in the second time domain resource allocation, and a fifth time domain offset indicated by the target time domain resource allocation is greater than or equal to a minimum time domain offset expected by the terminal, and is less than or equal to a maximum time domain offset expected by the terminal.

With reference to any one of the seventh aspect to the eighth possible implementation of the seventh aspect, in a ninth possible implementation of the seventh aspect, the second time domain offset is the first time domain offset, or the second time domain offset is a predefined time domain offset.

With reference to the seventh aspect, in a tenth possible implementation of the seventh aspect, the first information is specifically used to indicate the terminal to hand over to a first frequency domain resource, and the first time domain resource allocation is a time domain resource allocation corresponding to the first frequency domain resource.

With reference to the seventh aspect, in an eleventh possible implementation of the seventh aspect, the first information is specifically used to indicate the terminal to determine the first time domain resource allocation.

With reference to any one of the seventh aspect to the eleventh possible implementation of the seventh aspect, in a twelfth possible implementation of the seventh aspect, the third time domain offset indicated by the first time domain resource allocation is greater than or equal to the first time domain offset; or when the terminal has the second time domain resource allocation, the third time domain offset is greater than or equal to a sum of the first time domain offset and the fourth time domain offset.

With reference to any one of the seventh aspect to the eleventh possible implementation of the seventh aspect, in a thirteenth possible implementation of the seventh aspect, the third time domain offset indicated by the first time domain resource allocation is less than or equal to the first time domain offset; or when the terminal has the second time domain resource allocation, the third time domain offset is less than or equal to a sum of the first time domain offset and the fourth time domain offset.

With reference to any one of the seventh aspect to the twelfth possible implementation of the seventh aspect, in a fourteenth possible implementation of the seventh aspect, the sending unit is further configured to send a downlink data channel to the terminal based on the first time domain resource allocation.

With reference to any one of the seventh aspect to the fourteenth possible implementation of the seventh aspect, in a fifteenth possible implementation of the seventh aspect, when the terminal further has the second time domain resource allocation, when a first condition is met, the sending unit is further configured to: send first downlink control information DCI to the terminal, and send, to the terminal based on the first time domain resource allocation, a downlink data channel scheduled by the first DCI, where the first condition includes: a first timer is not running; and when a second condition is met, the sending unit is further configured to: send second DCI to the terminal, and send, to the terminal based on the second time domain resource allocation, a downlink data channel scheduled by the second DCI, where the second condition includes: the first timer is running.

For specific content of the first condition and a process in which the sending unit sends, to the terminal under a third condition based on the second time domain resource allocation, the downlink data channel scheduled by the second DCI, refer to the descriptions in the fourth aspect. Details are not described herein again.

According to an eighth aspect, an embodiment of this application further provides a communications apparatus. The communications apparatus may be a network device or a chip applied to the network device. The communications apparatus includes a processor and an interface circuit. The interface circuit is configured to support the communications apparatus in performing the message/data receiving and sending steps on the communications apparatus side described in the second aspect or any possible implementation of the second aspect. The processor is configured to support the communications apparatus in performing the message/data processing step on the communications apparatus side described in the second aspect or any possible implementation of the second aspect. For specific corresponding steps, refer to the descriptions in the second aspect or any possible implementation of the second aspect. Details are not described herein again.

The interface circuit is configured to receive information used to indicate a first time domain offset and/or information used to indicate low power consumption that are/is sent by a terminal. The interface circuit is configured to send first information to the terminal, where the first information is used by the terminal to determine a first time domain resource allocation.

With reference to the eighth aspect, in a first possible implementation of the eighth aspect, the first information includes the first time domain resource allocation, or the first information is specifically used to indicate the first time domain resource allocation.

With reference to the eighth aspect or the first possible implementation of the eighth aspect, in a second possible implementation of the eighth aspect, when the communications apparatus has a second time domain resource allocation, the first time domain resource allocation is determined by the network device based on the second time domain resource allocation and a second time domain offset.

With reference to the eighth aspect or the second possible implementation of the eighth aspect, in a third possible implementation of the eighth aspect, a third time domain offset is obtained based on a fourth time domain offset and the second time domain offset, and the fourth time domain offset is a time domain offset indicated by the second time domain resource allocation.

With reference to the third possible implementation of the eighth aspect, in a fourth possible implementation of the eighth aspect, the third time domain offset is the fourth time domain offset plus the second time domain offset; or a minimum value of the third time domain offset is the second time domain offset; or the third time domain offset is the fourth time domain offset plus the second time domain offset minus a minimum time domain offset indicated by the second time domain resource allocation.

With reference to the fourth possible implementation of the eighth aspect, in a fifth possible implementation of the eighth aspect, the third time domain offset is the fourth time domain offset minus the second time domain offset, or a maximum value of the third time domain offset is the second time domain offset.

With reference to the eighth aspect or the second possible implementation of the eighth aspect, in a sixth possible implementation of the eighth aspect, the first time domain resource allocation includes a target time domain resource allocation in the second time domain resource allocation, and a fifth time domain offset indicated by the target time domain resource allocation is greater than or equal to the second time domain offset.

With reference to the eighth aspect or the second possible implementation of the eighth aspect, in a seventh possible implementation of the eighth aspect, the first time domain resource allocation includes a target time domain resource allocation in the second time domain resource allocation, and a fifth time domain offset indicated by the target time domain resource allocation is less than or equal to the second time domain offset.

With reference to the eighth aspect or the second possible implementation of the eighth aspect, in an eighth possible implementation of the eighth aspect, the first time domain resource allocation includes a target time domain resource allocation in the second time domain resource allocation, and a fifth time domain offset indicated by the target time domain resource allocation is greater than or equal to a minimum time domain offset expected by the terminal, and is less than or equal to a maximum time domain offset expected by the terminal.

With reference to any one of the eighth aspect to the eighth possible implementation of the eighth aspect, in a ninth possible implementation of the eighth aspect, the second time domain offset is the first time domain offset, or the second time domain offset is a predefined time domain offset.

With reference to the eighth aspect or the first possible implementation of the eighth aspect, in a tenth possible implementation of the eighth aspect, the first information is specifically used to indicate the terminal to hand over to a first frequency domain resource, and the first time domain resource allocation is a time domain resource allocation corresponding to the first frequency domain resource.

With reference to the eighth aspect or the first possible implementation of the eighth aspect, in an eleventh possible implementation of the eighth aspect, the first information is specifically used to indicate the terminal to determine the first time domain resource allocation.

With reference to any one of the eighth aspect to the eleventh possible implementation of the eighth aspect, in a twelfth possible implementation of the eighth aspect, the third time domain offset indicated by the first time domain resource allocation is greater than or equal to the first time domain offset; or when the terminal has the second time domain resource allocation, the third time domain offset is greater than or equal to a sum of the first time domain offset and the fourth time domain offset.

With reference to any one of the eighth aspect to the eleventh possible implementation of the eighth aspect, in a thirteenth possible implementation of the eighth aspect, the third time domain offset indicated by the first time domain resource allocation is less than or equal to the first time domain offset; or w % ben the terminal has the second time domain resource allocation, the third time domain offset is less than or equal to a sum of the first time domain offset and the fourth time domain offset.

With reference to any one of the eighth aspect to the thirteenth possible implementation of the eighth aspect, in a fourteenth possible implementation of the eighth aspect, the sending unit is configured to send a downlink data channel to the terminal based on the first time domain resource allocation.

It should be noted that when the terminal/network device has two or more time domain resource allocations (for example, the first time domain resource allocation and the second time domain resource allocation), for a manner in which the network device sends a downlink data channel by using a time domain resource allocation in different cases, refer to the description in the fourth aspect. Details are not described herein again.

According to a ninth aspect, an embodiment of this application provides a communications apparatus. The communications apparatus may implement the method described in the third aspect or any possible implementation of the third aspect, and therefore may also achieve the beneficial effects in the third aspect or any possible implementation of the third aspect. The communications apparatus may be a terminal, or may be an apparatus that may support the terminal in implementing the method in the third aspect or any possible implementation of the third aspect, for example, a chip applied to the terminal. The communications apparatus may implement the foregoing method by using software or hardware, or by executing corresponding software by hardware.

The communications apparatus includes: a processing unit, configured to obtain a first time domain resource allocation and a second time domain resource allocation, where the first time domain resource allocation is different from the second time domain resource allocation; and a receiving unit, configured to: when a first condition is met, if the receiving unit receives first downlink control information DCI sent by a network device, receive, based on the first time domain resource allocation, a downlink data channel scheduled by the first DCI, where the first condition includes: a first timer is not running; and when a second condition is met, if the receiving unit receives second DCI sent by the network device, receive, based on the second time domain resource allocation, a downlink data channel scheduled by the second DCI, where the second condition includes: the first timer is running.

With reference to the ninth aspect, in a first possible implementation of the ninth aspect, the first timer is used to determine a time length for which the communications apparatus monitors a downlink control channel after receiving the downlink control channel.

With reference to the ninth aspect or the first possible implementation of the ninth aspect, in a second possible implementation of the ninth aspect, the processing unit starts or restarts the first timer when one of the following conditions is met: the receiving unit receives a downlink control channel; the receiving unit receives a downlink control channel indicating data transmission; and the receiving unit receives a downlink control channel indicating initial transmission, or a second timer is started or restarted, where the second timer is used by the processing unit to determine a time length for which the processing unit monitors the downlink control channel indicating initial transmission after the receiving unit receives the downlink control channel.

With reference to any one of the ninth aspect to the second possible implementation of the ninth aspect, in a third possible implementation of the ninth aspect, the first condition further includes: a third timer is running, and the third timer is used by the processing unit to determine a time length for which the communications apparatus monitors a downlink control channel in a discontinuous reception DRX cycle.

With reference to any one of the ninth aspect to the third possible implementation of the ninth aspect, in a fourth possible implementation of the ninth aspect, the first condition further includes one or more of the following cases: a downlink retransmission timer is not running; an uplink retransmission timer is not running; a contention resolution timer is not running; a scheduling request sent by the communications apparatus is not pending; and the communications apparatus receives a downlink control channel indicating initial transmission after successfully receiving a random access response RAR, where the downlink control channel indicating initial transmission is scrambled by using a first identifier, the RAR is a response to a target random access preamble, the target random access preamble is not a contention-based random access preamble, and the first identifier is used to identify the communications apparatus in a cell accessed by the communications apparatus in a random access procedure.

With reference to any one of the ninth aspect to the fourth possible implementation of the ninth aspect, in a fifth possible implementation of the ninth aspect, the communications apparatus provided in this embodiment of this application further includes: when the processing unit determines that a third condition is met, the receiving unit receives, based on the second time domain resource allocation, the downlink data channel scheduled by the second DCI, where the third condition includes one or more of the following: the downlink retransmission timer is running; the uplink retransmission timer is running; the contention resolution timer is running; the scheduling request sent by the communications apparatus is pending; and the communications apparatus does not receive the downlink control channel indicating initial transmission after successfully receiving the random access response RAR, where the downlink control channel indicating initial transmission is scrambled by using the first identifier, the RAR is a response to the target random access preamble, the target random access preamble is not a contention-based random access preamble, and the first identifier is used to identify the communications apparatus in the cell accessed by the communications apparatus in the random access procedure.

With reference to any one of the ninth aspect to the fourth possible implementation of the ninth aspect, in a fifth possible implementation of the ninth aspect, for a process in which the obtaining unit obtains the first time domain resource allocation and the second time domain resource allocation, refer to the descriptions in the first aspect. Details are not described herein again.

According to a tenth aspect, an embodiment of this application further provides a communications apparatus. The communications apparatus may be a terminal or a chip applied to the terminal. The communications apparatus includes a processor and an interface circuit. The interface circuit is configured to support the communications apparatus in performing the message/data receiving and sending steps on the communications apparatus side described in the third aspect or any possible implementation of the third aspect. The processor is configured to support the communications apparatus in performing the message/data processing step on the communications apparatus side described in the third aspect or any possible implementation of the third aspect. For specific corresponding steps, refer to the descriptions in the third aspect or any possible implementation of the third aspect. Details are not described herein again.

The processor is configured to obtain a first time domain resource allocation and a second time domain resource allocation, where the first time domain resource allocation is different from the second time domain resource allocation. The interface circuit is configured to: when a first condition is met, if the interface circuit receives first downlink control information DCI sent by a network device, receive, based on the first time domain resource allocation, a downlink data channel scheduled by the first DCI, where the first condition includes: a first timer is not running, and when a second condition is met, if the interface circuit receives second DCI sent by the network device, receive, based on the second time domain resource allocation, a downlink data channel scheduled by the second DCI, where the second condition includes: the first timer is running.

With reference to the tenth aspect, in a first possible implementation of the tenth aspect, the first timer is used to determine a time length for which the communications apparatus monitors a downlink control channel after receiving the downlink control channel.

With reference to the tenth aspect or the first possible implementation of the tenth aspect, in a second possible implementation of the tenth aspect, the processor starts or restarts the first timer when one of the following conditions is met: the interface circuit receives a downlink control channel; the interface circuit receives a downlink control channel indicating data transmission; and the interface circuit receives a downlink control channel indicating initial transmission, or a second timer is started or restarted, where the second timer is used to determine a time length for monitoring the downlink control channel indicating initial transmission after the interface circuit receives the downlink control channel.

With reference to any one of the tenth aspect to the second possible implementation of the tenth aspect, in a third possible implementation of the tenth aspect, the first condition further includes: a third timer is running, and the third timer is used by the processor to determine a time length for monitoring a downlink control channel in a discontinuous reception DRX cycle.

With reference to any one of the tenth aspect to the third possible implementation of the tenth aspect, in a fourth possible implementation of the tenth aspect, the first condition further includes one or more of the following cases: a downlink retransmission timer is not running; an uplink retransmission timer is not running; a contention resolution timer is not running; a scheduling request sent by the communications apparatus is not pending; and the communications apparatus receives a downlink control channel indicating initial transmission after successfully receiving a random access response RAR, where the downlink control channel indicating initial transmission is scrambled by using a first identifier, the RAR is a response to a target random access preamble, the target random access preamble is not a contention-based random access preamble, and the first identifier is used to identify the communications apparatus in a cell accessed by the communications apparatus in a random access procedure.

With reference to any one of the tenth aspect to the fourth possible implementation of the tenth aspect, in a fifth possible implementation of the tenth aspect, when the processor determines that a third condition is met, the interface circuit receives, based on the second time domain resource allocation, the downlink data channel scheduled by the second DCI, where the third condition includes one or more of the following: the downlink retransmission timer is running; the uplink retransmission timer is running; the contention resolution timer is running; the scheduling request sent by the communications apparatus is pending; and the communications apparatus does not receive the downlink control channel indicating initial transmission after successfully receiving the RAR, where the downlink control channel indicating initial transmission is scrambled by using the first identifier, the RAR is a response to the target random access preamble, the target random access preamble is not a contention-based random access preamble, and the first identifier is used to identify the communications apparatus in the cell accessed by the communications apparatus in the random access procedure.

According to an eleventh aspect, an embodiment of this application provides a communications apparatus. The communications apparatus may implement the method described in the fourth aspect or any possible implementation of the fourth aspect, and therefore may also achieve the beneficial effects in the fourth aspect or any possible implementation of the fourth aspect. The communications apparatus may be a network device, or may be an apparatus that may support the network device in implementing the method in the fourth aspect or any possible implementation of the fourth aspect, for example, a chip applied to the communications apparatus. The communications apparatus may implement the foregoing method by using software or hardware, or by executing corresponding software by hardware.

The communications apparatus includes: a sending unit, configured to: when a first condition is met, send first DCI to a terminal, and send, to the terminal based on a first time domain resource allocation, a downlink data channel scheduled by the first DCI, where the first condition includes: a first timer is not running; and when a second condition is met, send second DCI to the terminal, and send, to the terminal based on a second time domain resource allocation, a downlink data channel scheduled by the second DCI, where the second condition includes: the first timer is running.

With reference to the eleventh aspect, in a first possible implementation of the eleventh aspect, the first timer is used to determine a time length for which the terminal monitors a downlink control channel after receiving the downlink control channel.

With reference to the eleventh aspect or the first possible implementation of the eleventh aspect, in a second possible implementation of the eleventh aspect, the first condition further includes: a third timer is running, and the third timer is used to determine a time length for which the terminal monitors a downlink control channel in a discontinuous reception DRX cycle.

With reference to any one of the eleventh aspect to the second possible implementation of the eleventh aspect, in a third possible implementation of the eleventh aspect, the first condition further includes one or more of the following cases: a downlink retransmission timer is not running; an uplink retransmission timer is not running; a contention resolution timer is not running; a scheduling request sent by the terminal is not pending; and the terminal receives a downlink control channel indicating initial transmission after successfully receiving a random access request RAR, where the downlink control channel indicating initial transmission is scrambled by using a first identifier, the RAR is a response to a target random access preamble, the target random access preamble is not a contention-based random access preamble, and the first identifier is used to identify the terminal in a cell accessed by the terminal in a random access procedure.

With reference to any one of the eleventh aspect to the second possible implementation of the thirteenth aspect, in a fourth possible implementation of the twelfth aspect, when a third condition is met, the sending unit is configured to send, to the terminal based on the second time domain resource allocation, the downlink data channel scheduled by the second DCI, where the third condition includes one or more of the following: the downlink retransmission timer is running; the uplink retransmission timer is running; the contention resolution timer is running; the scheduling request sent by the terminal is pending; and the terminal receives the downlink control channel indicating initial transmission after successfully receiving the random access response RAR, where the downlink control channel indicating initial transmission is scrambled by using the first identifier, the RAR is a response to the target random access preamble, the target random access preamble is not a contention-based random access preamble, and the first identifier is used to identify the terminal in the cell accessed by the terminal in the random access procedure.

According to a twelfth aspect, an embodiment of this application further provides a communications apparatus. The communications apparatus may be a network device or a chip applied to the network device. The communications apparatus includes a processor and an interface circuit. The interface circuit is configured to support the communications apparatus in performing the message/data receiving and sending steps on the communications apparatus side described in the fourth aspect or any possible implementation of the fourth aspect. The processor is configured to support the communications apparatus in performing the message/data processing step on the communications apparatus side described in the fourth aspect or any possible implementation of the fourth aspect. For specific corresponding steps, refer to the descriptions in the fourth aspect or any possible implementation of the fourth aspect. Details are not described herein again.

The interface circuit is configured to: when the processor determines that a first condition is met, send first downlink control information DCI to a terminal, and send, to the terminal based on a first time domain resource allocation, a downlink data channel scheduled by the first DCI, where the first condition includes: a first timer is not running; and the interface circuit is configured to: when the processor determines that a second condition is met, send second DCI to the terminal, and send, to the terminal based on a second time domain resource allocation, a downlink data channel scheduled by the second DCI, where the second condition includes: the first timer is running.

With reference to the twelfth aspect, in a first possible implementation of the twelfth aspect, the first timer is used to determine a time length for which the terminal monitors a downlink control channel after receiving the downlink control channel.

With reference to the twelfth aspect or the first possible implementation of the twelfth aspect, in a second possible implementation of the twelfth aspect, the first condition further includes: a third timer is running, and the third timer is used to determine a time length for which the terminal monitors a downlink control channel in a discontinuous reception DRX cycle.

With reference to any one of the twelfth aspect to the second possible implementation of the twelfth aspect, in a third possible implementation of the twelfth aspect, the first condition further includes one or more of the following cases: a downlink retransmission timer is not running; an uplink retransmission timer is not running; a contention resolution timer is not running; a scheduling request sent by the terminal is not pending; and the terminal receives a downlink control channel indicating initial transmission after successfully receiving a RAR, where the downlink control channel indicating initial transmission is scrambled by using a first identifier, the RAR is a response to a target random access preamble, the target random access preamble is not a contention-based random access preamble, and the first identifier is used to identify the terminal in a cell accessed by the terminal in a random access procedure.

With reference to any one of the twelfth aspect to the third possible implementation of the twelfth aspect, in a fourth possible implementation of the twelfth aspect, when the processor determines that a third condition is met, the interface circuit is configured to send, to the terminal based on the second time domain resource allocation, the downlink data channel scheduled by the second DCI, where the third condition includes one or more of the following: the downlink retransmission timer is running; the uplink retransmission timer is running; the contention resolution timer is running; the scheduling request sent by the terminal is pending; and the terminal does not receive the downlink control channel indicating initial transmission after successfully receiving the random access response RAR, where the downlink control channel indicating initial transmission is scrambled by using the first identifier, the RAR is a response to the target random access preamble, the target random access preamble is not a contention-based random access preamble, and the first identifier is used to identify the terminal in the cell accessed by the terminal in the random access procedure.

It should be noted that the processor and the interface circuit included in the communications apparatus provided in the sixth aspect, the eighth aspect, the tenth aspect, and the twelfth aspect of the embodiments of this application are coupled to each other. The interface circuit may also be referred to as a transceiver.

Optionally, the communications apparatus provided in the sixth aspect, the eighth aspect, the tenth aspect, and the twelfth aspect may further include a memory, configured to store code and data. The processor, the interface circuit, and the memory are coupled to each other.

According to a thirteenth aspect, this application provides a computer readable storage medium. The computer readable storage medium stores an instruction. When the instruction is run on a computer, the computer is enabled to perform the communications method described in the first aspect or the possible implementations of the first aspect.

According to a fourteenth aspect, this application provides a computer readable storage medium. The computer readable storage medium stores an instruction. When the instruction is run on a computer, the computer is enabled to perform the communications method described in the second aspect or the possible implementations of the second aspect.

According to a fifteenth aspect, this application provides a computer readable storage medium. The computer readable storage medium stores an instruction. When the instruction is run on a computer, the computer is enabled to perform the data channel receiving method described in the third aspect or the possible implementations of the third aspect.

According to a sixteenth aspect, this application provides a computer readable storage medium. The computer readable storage medium stores an instruction. When the instruction is run on a computer, the computer is enabled to perform the data channel sending method described in the fourth aspect or the possible implementations of the fourth aspect.

According to a seventeenth aspect, this application provides a computer program product including an instruction. When the instruction is run on a computer, the computer is enabled to perform the communications method described in the first aspect or the possible implementations of the first aspect.

According to an eighteenth aspect, this application provides a computer program product including an instruction. When the instruction is run on a computer, the computer is enabled to perform the communications method described in the second aspect or the possible implementations of the second aspect.

According to a nineteenth aspect, this application provides a computer program product including an instruction. When the instruction is run on a computer, the computer is enabled to perform the downlink data channel receiving method described in the third aspect or the possible implementations of the third aspect.

According to a twentieth aspect, this application provides a computer program product including an instruction. When the instruction is run on a computer, the computer is enabled to perform the downlink data channel sending method described in the fourth aspect or the possible implementations of the fourth aspect.

According to a twenty-first aspect, an embodiment of this application provides a chip. The chip includes a processor and an interface circuit. The interface circuit is coupled to the processor. The processor is configured to run a computer program or an instruction, to implement the communications method described in the first aspect or the possible implementations of the first aspect. The interface circuit is configured to communicate with a module other than the chip.

According to a twenty-second aspect, an embodiment of this application provides a chip. The chip includes a processor and an interface circuit. The interface circuit is coupled to the processor. The processor is configured to run a computer program or an instruction, to implement the communications method described in the second aspect or the possible implementations of the second aspect. The interface circuit is configured to communicate with a module other than the chip.

According to a twenty-third aspect, an embodiment of this application provides a chip. The chip includes a processor and an interface circuit. The interface circuit is coupled to the processor. The processor is configured to run a computer program or an instruction, to implement the downlink data channel receiving method described in the third aspect or the possible implementations of the third aspect. The interface circuit is configured to communicate with a module other than the chip.

According to a twenty-fourth aspect, an embodiment of this application provides a chip. The chip includes a processor and an interface circuit. The interface circuit is coupled to the processor. The processor is configured to run a computer program or an instruction, to implement the downlink data channel sending method described in the fourth aspect or the possible implementations of the fourth aspect. The interface circuit is configured to communicate with a module other than the chip.

Specifically, the chip provided in this embodiment of this application further includes a memory, configured to store the computer program or the instruction.

According to a twenty-fifth aspect, an embodiment of this application provides a communications apparatus. The communications apparatus includes one or more modules, configured to implement the method in the first aspect, the second aspect, the third aspect, or the fourth aspect, the one or more modules may correspond to the steps of the method in the first aspect, the second aspect, the third aspect, or the fourth aspect.

According to a twenty-sixth aspect, an embodiment of this application provides a communications system. The communications system includes the communications apparatus described in the possible implementations of the fifth aspect and the communications apparatus described in the possible implementations of the seventh aspect.

According to a twenty-seventh aspect, an embodiment of this application provides a communications system. The communications system includes the communications apparatus described in the possible implementations of the ninth aspect and the communications apparatus described in the possible implementations of the eleventh aspect.

According to a twenty-eighth aspect, an embodiment of this application provides a communications system. The communications system includes the communications apparatus described in the possible implementations of the sixth aspect and the communications apparatus described in the possible implementations of the eighth aspect.

According to a twenty-ninth aspect, an embodiment of this application provides a communications system. The communications system includes the communications apparatus described in the possible implementations of the tenth aspect and the communications apparatus described in the possible implementations of the twelfth aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system provided above, refer to beneficial effects of a corresponding solution in the corresponding method provided above. Details are not described herein again.

DESCRIPTION OF EMBODIMENTS

Figure 1:
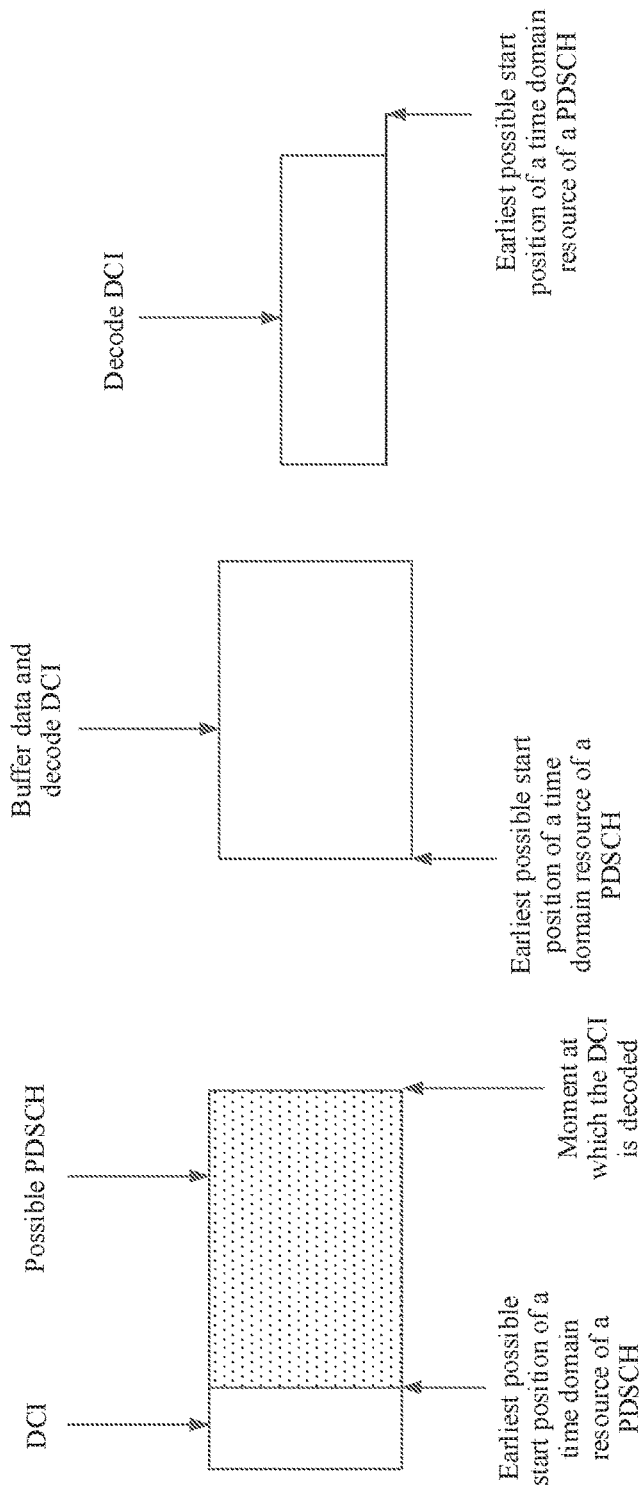
FIG. 1(a) to FIG. 1(c) are schematic diagrams of a start position of a time domain resource of a downlink data channel and a position of DCI.

Before the embodiments of this application are described, terms used in the embodiments of this application are first explained.

(1) Time domain offset: The time domain offset may include an offset of a time domain position of a downlink data channel relative to a time domain position of DCI for scheduling the downlink data channel. Alternatively, the time domain offset may include an offset of a start position of a time domain resource of a downlink data channel relative to a start position of a time domain resource of DCI for scheduling the downlink data channel. Alternatively, the time domain offset may include an offset of a slot in which a downlink data channel is located relative to a slot in which DCI for scheduling the downlink data channel is located. Alternatively, the time domain offset may include an offset of a start symbol of a downlink data channel in a slot in which the downlink data channel is located relative to a start of a slot in which DCI for scheduling the downlink data channel is located. Alternatively, the time domain offset may include an offset of a start symbol of a downlink data channel in a slot in which the downlink data channel is located relative to a start of a slot in which the downlink data channel is located. The start of the slot may be the first symbol (for example, a symbol 0) of the slot.

For example, the downlink data channel in the embodiments of this application may be a physical downlink shared channel (Physical Downlink Shared Channel, PDSCH).

(2) Time domain resource allocation

The time domain resource allocation in the embodiments of this application may exist in the form of a list, or may exist in the form of a table. This is not limited in the embodiments of this application. A time domain resource allocation that exists in the form of a list may be referred to as a time domain resource allocation list, and a time domain resource allocation that exists in the form of a table may be referred to as a time domain resource allocation table. The time domain resource allocation list and the time domain resource allocation table each include an index and a time domain resource allocation corresponding to the index.

For example, a network device may configure a time domain resource allocation list (for example, a PDSCH-allocation List (PDSCH-Allocation List) or a PDSCH-time domain resource allocation list (PDSCH-TimeDomainResourceAllocationList)) for a terminal by using radio resource control (Radio Resource Control, RRC) signaling (for example, a PDSCH common configuration (PDSCH-ConfigCommon) or a PDSCH configuration (PDSCH-Config)). For example, the terminal may further obtain a time domain resource allocation from a predefined time domain resource allocation table/list. For example, Table 1 is a predefined time domain resource allocation table.

Currently, a predefined PDSCH-allocation list or a predefined PDSCH-time domain resource allocation list may include one or more PDSCH-time domain resource allocations, and each PDSCH-time domain resource allocation indicates one time domain resource allocation.

TABLE 1

Time domain resource allocation table

| Row index (Row index) | DMRS-TypeA-Position | PDSCH type (Type) | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

The DRMS in Table 1 represents a demodulation reference signal (Demodulation Reference Signal).

In Table 1, each row index corresponds to one time domain resource allocation. The time domain resource allocation may include $K_0$, a start symbol (start Symbol), and a length (Length). $K_0$ represents a slot offset, and the length may be a quantity of symbols. To be specific, each time domain resource allocation includes a slot offset, a start symbol, and a length (a quantity of symbols). The terminal may determine a start position of a time domain resource of a downlink data channel based on a slot offset and a start symbol.

Specifically, the terminal determines, based on a slot in which DCI for scheduling the downlink data channel is located and the slot offset, a slot in which the downlink data channel is located, and determines that a start symbol of a start in the slot in which the downlink data channel is located is the start position of the time domain resource of the downlink data channel.

For example, if the slot in which the DCI for scheduling the downlink data channel is located is a slot 0, and the slot offset Ku is 0, the slot in which the downlink data channel is located is also the slot 0. If the start symbol is a symbol 2 (namely, the third symbol), the start position of the time domain resource of the downlink data channel is the symbol 2 in the slot 0.

The terminal may determine, based on an RRC signaling configuration status and a radio network temporary identifier (RNTI) used to scramble DCI, a time domain resource allocation table/list to be used. For example, for DCI scrambled by using a C-RNTI, if a base station configures a PDSCH-allocation list in PDSCH-Config, a time domain resource allocation indicated by the PDSCH-allocation list in PDSCH-Config is to be used, or if the base station configures a PDSCH-allocation list in PDSCH-ConfigCommon, a time domain resource allocation indicated by the PDSCH-allocation list in PDSCH-ConfigCommon is to be used. Otherwise, a time domain resource allocation table defined in the standard protocol is to be used.

The terminal determines, based on a time domain resource assignment field in the DCI and the determined time domain resource allocation table/list, the time domain resource allocation of the downlink data channel scheduled by using the DCI. For example, a value of the time domain resource assignment field in the DCI is m. If the used time domain resource allocation table/list is the PDSCH-allocation list or the PDSCH-time domain resource allocation list configured in the RRC signaling, the time domain resource allocation of the downlink data channel scheduled by using the DCI is the $(m+1)^{th}$ time domain resource allocation in the PDSCH-allocation list or the PDSCH-time domain resource allocation list, namely, the $(m+1)^{th}$ PDSCH-time domain resource allocation. If the used time domain resource allocation table/list is a time domain resource allocation table defined in a standard protocol, the time domain resource allocation of the downlink data channel scheduled by using the DCI is a time domain resource allocation with a row index (m+1) in the table. Herein, m is an integer greater than or equal to 0.

It should be noted that the embodiments of this application use an example in which a value of the time domain resource assignment field in the DCI starts from 0, and a row index in the time domain resource allocation table/list usually starts from 1. Therefore, if a value of the time domain resource assignment field is m, the time domain resource allocation of the downlink data channel scheduled by using the DCI is a time domain resource allocation with a row index (m+1) in the time domain resource allocation table/list. It is assumed that a value of the time domain resource assignment field in the DCI is the same as a start value of a row index in the time domain resource allocation table/list. In this case, if the value of the time domain resource assignment field is in, the time domain resource allocation of the downlink data channel scheduled by using the DCI is a time domain resource allocation with a row index m in the time domain resource allocation table/list.

In this application, "of (English: of)", "corresponding (English: corresponding, related)", and "corresponding (English: corresponding)" may be interchangeably used sometimes. It should be noted that consistent meanings are expressed when differences are not emphasized.

It should be noted that, in the embodiments of this application, the term "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a specific manner.

In the embodiments of this application, "at least one" means one or more, and "a plurality of" means two or more. The term "and/or" describes an association relationship between associated objects and represents that three relationships may exist. For example. A and/or B may represent the following three cases: Only A exists, both A and B exist, and only B exists. A and B may be in a singular or plural form. The character "/" generally indicates an "or" relationship between the associated objects. "At least one of the following" or a similar expression indicates any combination of the items, and includes any combination of singular items or plural items. For example, at least one of a, b, or c may represent a, b, c, a and b, a and c, b and c, or a, b, and c, where a, b, and c may be in a singular or plural form. In addition, to clearly describe the technical solutions in the embodiments of this application, terms such as "first" and "second" are used in the embodiments of this application to distinguish between same items or similar items that have a basically same function and purpose. A person skilled in the art may understand that the terms such as "first" and "second" do not limit a quantity or an execution sequence, and the terms such as "first" and "second" do not indicate a definite difference.

Figure 2:
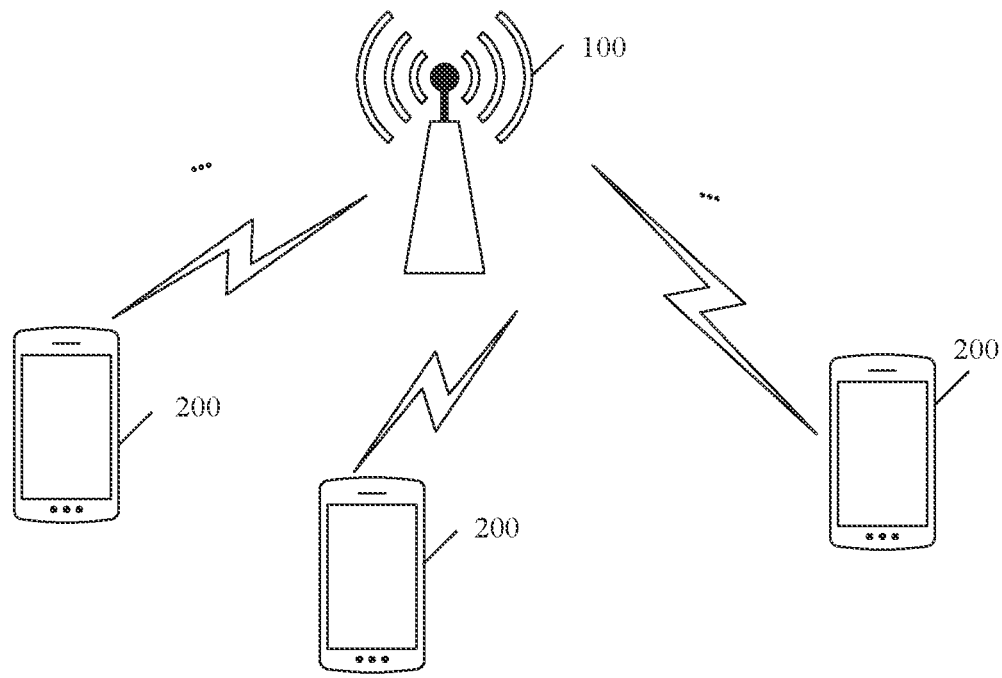
FIG. 2 is a schematic diagram of a communications system according to an embodiment of this application.

FIG. 2 is a schematic diagram of a communications system according to an embodiment of this application. The communications system includes at least one network device 100 and at least one terminal 200 (FIG. 2 shows only three terminals, and there may be at least three or less terminals in an actual scenario). The at least one terminal 200 performs wireless communication with the at least one network device 100.

Optionally, the communications system shown in FIG. 2 may further include a core network, and the at least one network device 100 may be connected to the core network. The core network may be a 4G core network (for example, an evolved packet core (Evolved Packet Core, EPC)) or a 5G core network (5G Core, 5GC).

In the embodiments of this application, the terminal (terminal) 200 is a device that provides voice and/or data connectivity for a user, for example, a handheld device or a vehicle-mounted device with a wireless connection function. The terminal may also be referred to as user equipment (User Equipment, UE), an access terminal (Access Terminal), a user unit (User Unit), a user station (User Station), a mobile station (Mobile Station), a mobile console (Mobile), a remote station (Remote Station), a remote terminal (Remote Terminal), mobile equipment (Mobile Equipment), a user terminal (User Terminal), wireless telecom equipment (Wireless Telecom Equipment), a user agent (User Agent), user equipment (User Equipment), or a user apparatus. The terminal may be a station (Station, STA) in a wireless local area network (Wireless Local Area Networks, WLAN); or may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device having a wireless communication function, a computing device or another processing device connected to a wireless modem, a vehicle-mounted device, a wearable device, a terminal in a next generation communications system (for example, a 5th generation (Fifth-Generation, 5G) communications network), a terminal in a future evolved public land mobile network (Public Land Mobile Network, PLMN) network, or the like. 5G may also be referred to as new radio (New Radio, NR).

For example, in the embodiments of this application, the terminal 200 may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not merely a hardware device, but is used to implement powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

The network device 100 in the embodiments of this application is an entity that may cooperate with the terminal 200 to transmit or receive a signal. The network device 100 includes a base station (base station, BS). The base station may be in a plurality of forms, for example, a macro base station, a micro base station, a relay station, and an access point. For example, the base station in the embodiments of this application may be a base station in NR. The base station in NR may also be referred to as a transmission reception point (transmission reception point, TRP) or a gNB, or may be a base transceiver station (Base Transceiver Station, BTS) in GSM or CDMA, or may be a NodeB (NodeB, NB) in a WCDMA system, or may be an evolved NodeB (Evolutional NodeB, eNB or eNodeB) in an LTE system, or may be a next generation NodeB (Next generation NodeB, gNB) in a future 5G network. The network device in the embodiments of this application may alternatively include a device that is deployed in a radio access network and that can perform wireless communication with the terminal, for example, may be a radio controller in a cloud radio access network (Cloud Radio Access Network, CRAN) scenario. Alternatively, the network device may be a relay station, an access point, a network device in a future 5G network, a network device in a future evolved public land mobile network (Public Land Mobile Network, PLMN), or the like. In the embodiments of this application, an apparatus that implements a function of the network device may be the network device, or may be an apparatus that supports the network device in implementing the function, for example, a chip, a circuit, or another apparatus. In the embodiments of this application, an example in which the apparatus for implementing the function of the network device is the network device is used to describe the technical solutions provided in the embodiments of this application.

In addition, in the embodiments of this application, the network device 100 provides a service for a cell, and the terminal 200 performs wireless communication with the network device 100 by using a transmission resource (for example, a time domain resource, a frequency domain resource, or a time-frequency resource) used by the cell. The cell may be a cell corresponding to the network device 100. The cell may belong to a macro network device, or may belong to a network device corresponding to a small cell (small cell). The small cell herein may include a metro cell (metro cell), a micro cell (micro cell), a pico cell (Pico cell), a femto cell (femto cell), and the like. These small cells have characteristics of small coverage and low transmit power, and are applicable to providing a high-speed data transmission service.

Figure 3:
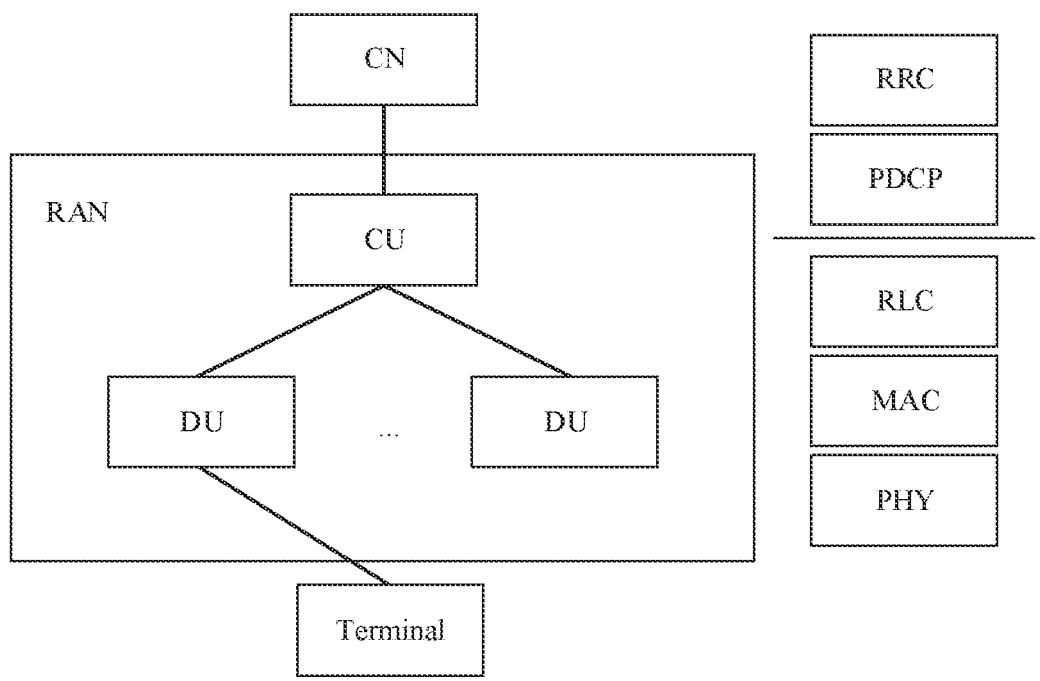
FIG. 3 is a schematic structural diagram 1 of a base station according to an embodiment of this application.

In the future, the base station may be implemented by using a cloud radio access network (cloud radio access network. C-RAN) architecture. In a possible manner, a protocol stack architecture and a function of a conventional base station are divided into two parts. One part is referred to as a central unit (central unit, CU), and the other part is referred to as a distributed unit (distributed unit, DU). As shown in FIG. 3, some CUs of a plurality of base stations are integrated together to form a large-scale function entity. A plurality of DUs may be all controlled by one CU. As shown in FIG. 3, the CU and the DU may be divided based on a protocol layer of a wireless network. For example, functions of a packet data convergence protocol (packet data convergence protocol, PDCP) layer and a protocol layer (for example, a radio resource control (radio resource control. RRC) layer) above the PDCP layer are set on the CU. Functions of protocol layers below the PDCP, such as a radio link control (radio link control, RLC) layer, a medium access control (medium access control. MAC) layer, and a physical layer (Physical layer, PHY) are set on the DU.

It may be understood that division of the protocol layers shown in FIG. 3 is merely an example, and division may be performed at another protocol layer. For example, division is performed at an RLC layer, functions of the RLC layer and a protocol layer above the RLC layer are set on the CU, and functions of a protocol layer below the RLC layer are set on the DU. Alternatively, division is performed at a protocol layer. For example, some functions of the RLC layer and functions of a protocol layer above the RLC layer are set on the CU, and remaining functions of the RLC layer and functions of a protocol layer below the RLC layer are set on the DU. In addition, division may alternatively be performed in another manner, for example, the division is performed based on a delay. A function whose processing time needs to meet a delay requirement is set on the DU, and a function whose processing time does not need to meet the delay requirement is set on the CU. This is not limited in this embodiment of this application.

Figure 4:
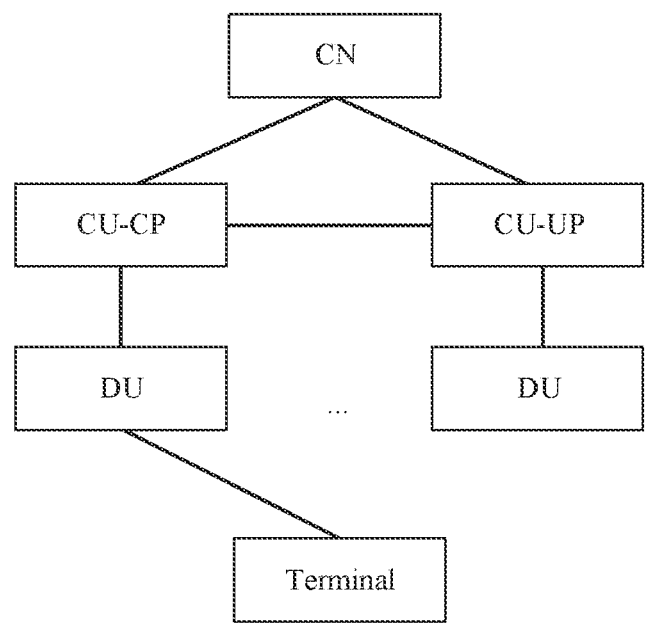
FIG. 4 is a schematic structural diagram 2 of a base station according to an embodiment of this application.

In addition, referring to FIG. 4, different from the architecture shown in FIG. 3, a control plane (control plane, CP) and a user plane (user plane, UP) of a CU may be further separated and implemented by dividing the CU into different entities, which are a control plane CU entity (CU-CP entity) and a user plane CU entity (CU-UP entity).

In the foregoing network architecture, data generated by the CU may be sent to the terminal through the DU. Alternatively, data generated by the terminal may be sent to the CU through the DU. The DU may directly encapsulate the data at a protocol layer and then transmit encapsulated data to the terminal or the CU, without parsing the data. For example, data at the RRC layer or the PDCP layer is finally processed as data at the physical layer (Physical Layer, PHY) and sent to the terminal, or is converted from received data at the PHY layer. In this architecture, it may also be considered that the data at the RRC layer or the PDCP layer is sent by the DU.

In the foregoing embodiment, the CU is a base station in the RAN. In addition, the CU may alternatively a base station in a core network CN. This is not limited herein.

An apparatus in the following embodiments of this application may be located in a terminal or a base station based on functions implemented by the apparatus. When the foregoing CU-DU structure is used, the base station may be a CU node, a DU node, or a RAN device including functions of a CU node and a DU node.

Figure 5:
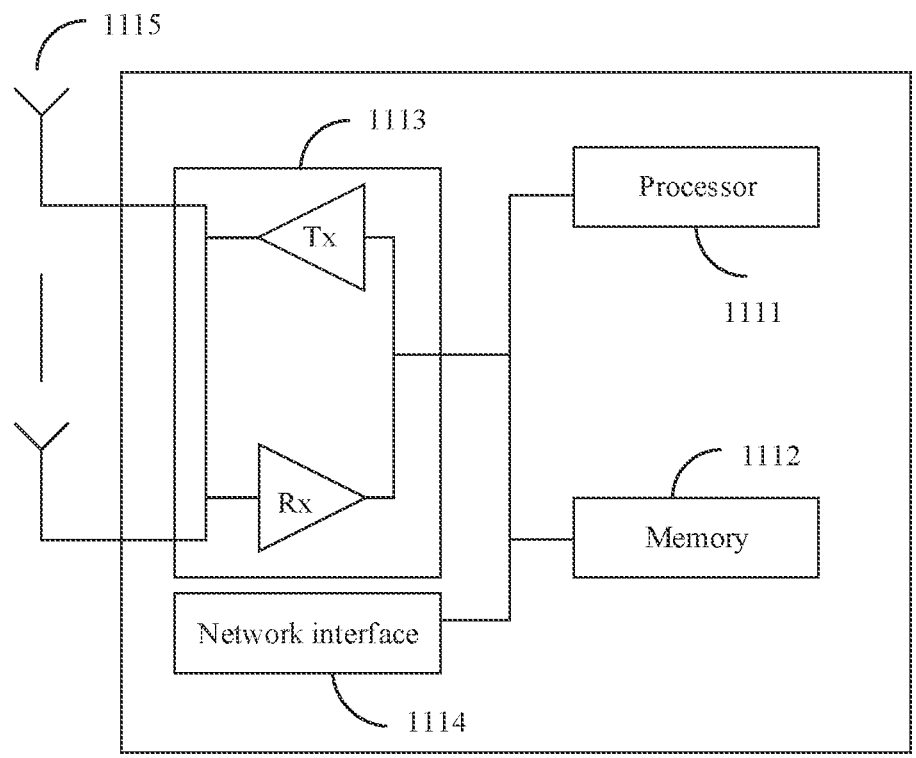
FIG. 5 is a schematic structural diagram 3 of a base station according to an embodiment of this application.

As shown in FIG. 5, the network device 100 in the embodiments of this application may be a base station. The base station is used as an example below to describe the embodiments in detail. It should be understood that the base station shown in FIG. 5 is merely an example of the network device 100, and the base station may have more or fewer components than those shown in the FIG. 5, or two or more components may be combined, or different component configurations may be used.

As shown in FIG. 5, the base station includes at least one processor 1111, at least one memory 1112, at least one transceiver 1113, at least one network interface 1114, and one or more antennas 1115. The processor 1111, the memory 1112, the transceiver 1113, and the network interface 1114 are connected to each other, for example, by using a bus. The antenna 1115 is connected to the transceiver 1113. The network interface 1114 is configured to enable the base station to be connected to another communications device through a communication link. For example, the base station is connected to a core network element through an SI interface/NG interface. In the embodiments of this application, the connection may be implemented by using various types of interfaces, transmission lines, buses, or the like. This is not limited in the embodiments.

The processor in the embodiments of this application, for example, the processor 1111, may include at least one of the following types: a central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 1111 may be a single-core (single-CPU) processor or a multi-core (multi-CPU) processor. The at least one processor 1111 may be integrated into one chip or located on a plurality of different chips.

The memory in the embodiments of this application, for example, the memory 1112, may include at least one of the following types: a read-only memory (read-only memory, ROM) or another type of static storage device that can store static information and an instruction, a random access memory (random access memory, RAM) or another type of dynamic storage device that can store information and an instruction, or an electrically erasable programmable read-only memory (Electrically erasable programmable read-only memory, EEPROM). In some scenarios, the memory may further be a compact disc read-only memory (compact disc read-only memory. CD-ROM) or other disc storage or optical disc storage (including a compact disc, a laser disc, an optical disc, a digital versatile disc, a Blu-ray optical disc, and the like), a magnetic disk storage medium, another magnetic storage device, or any other medium that can be configured to carry or store expected program code in the form of an instruction or a data structure and that is accessible by a computer, but is not limited thereto.

The memory 1112 may exist independently, and is connected to the processor 1111. Optionally, the memory 1112 may alternatively be integrated with the processor 1111, for example, integrated into a chip. The memory 1112 can store program code for executing the technical solutions in the embodiments of this application, and the processor 1111 controls the execution. Various types of executed computer program code may also be considered as a driver of the processor 1111. For example, the processor 1111 is configured to execute the computer program code stored in the memory 1112, to implement the technical solutions in the embodiments of this application.

The transceiver 1113 may be configured to support receiving or sending of a radio frequency signal between the base station and the terminal, and the transceiver 1113 may be connected to the antenna 1115. The transceiver 1113 includes a transmitter Tx and a receiver Rx. Specifically, the one or more antennas 1115 may receive a radio frequency signal. The receiver Rx of the transceiver 1113 is configured to: receive the radio frequency signal from the antenna, convert the radio frequency signal into a digital baseband signal or a digital intermediate frequency signal, and provide the digital baseband signal or the digital intermediate frequency signal for the processor 1111, so that the processor 1111 further processes (for example, demodulates or decodes) the digital baseband signal or the digital intermediate frequency signal. In addition, the transmitter Tx of the transceiver 1113 is further configured to: receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal, to obtain the radio frequency signal. A sequence of the frequency up-mixing processing and the digital-to-analog conversion processing is adjustable. The digital baseband signal and the digital intermediate frequency signal may be collectively referred to as a digital signal.

Figure 6:
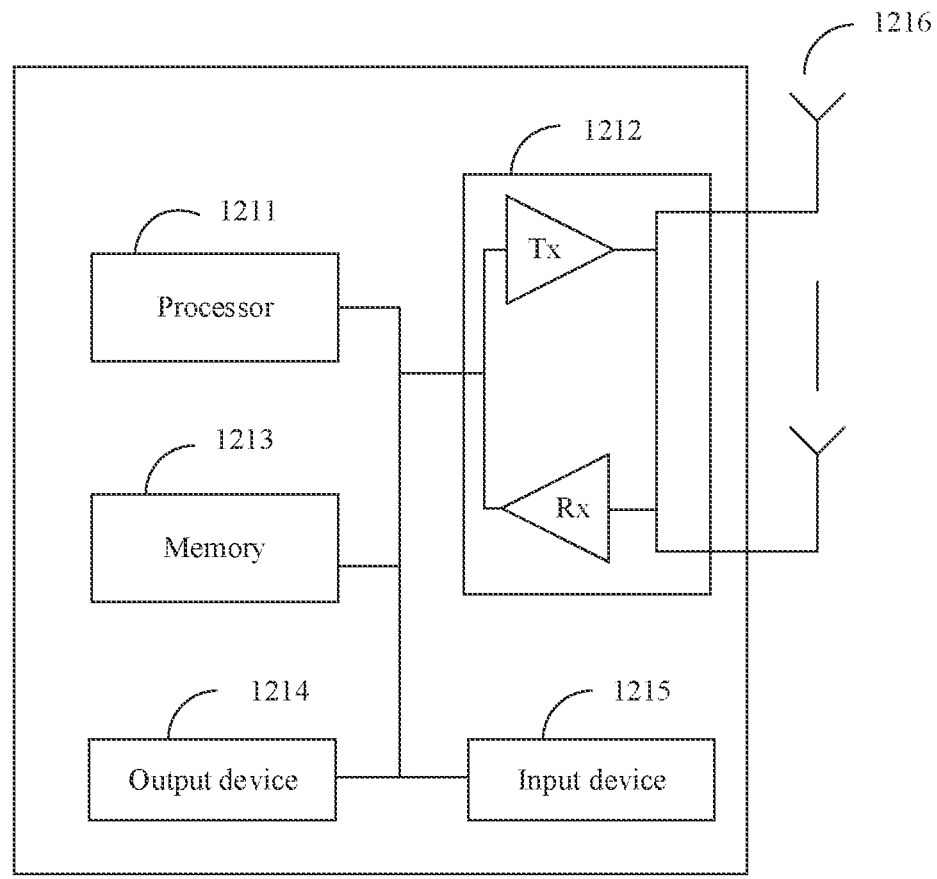
FIG. 6 is a schematic structural diagram of a terminal according to an embodiment of this application.

FIG. 6 is a schematic structural diagram of a terminal according to an embodiment of this application. For a structure of the terminal 200, refer to the structure shown in FIG. 6. It should be understood that the terminal shown in FIG. 6 is merely an example, and the terminal may have more or fewer components than those shown in the FIG. 6, or two or more components may be combined, or different component configurations may be used.

The terminal includes at least one processor 1211, at least one transceiver 1212, and at least one memory 1213. The processor 1211, the memory 1213, and the transceiver 1212 are connected to each other. Optionally, the terminal 121 may further include an output device 1214, an input device 1215, and one or more antennas 1216. The antenna 1216 is connected to the transceiver 1212, and the output device 1214 and the input device 1215 are connected to the processor 1211.

For the transceiver 1212, the memory 1213, and the antenna 1216, refer to related descriptions in FIG. 5. Similar functions are implemented.

The processor 1211 may be a baseband processor, or may be a CPU. The baseband processor and the CPU may be integrated or separated.

The processor 1211 may be configured to implement various functions for the terminal, for example, configured to process a communications protocol and communication data, or configured to control the entire terminal device, to execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (Liquid Crystal Display, LCD), a light emitting diode (Light Emitting Diode, LED) display device, a cathode ray tube (Cathode Ray Tube, CRT) display device, or a projector (projector). The input device 1215 communicates with the processor 1211, and may receive a user input in a plurality of manners. For example, the input device 1215 may be a mouse, a keyboard, a touchscreen device, or a sensing device.

For ease of understanding of technical solutions in embodiments of this application, the following first briefly describes related technologies of this application.

(1) Carrier Aggregation (Carrier Aggregation, CA)

Carriers in the embodiments of this application include a carrier in a non-carrier aggregation (carrier aggregation, CA) scenario and a component carrier (component carrier, CC) in a CA scenario. The CC in the CA scenario may be a primary component carrier (Primary component carrier, PCC) or a secondary component carrier (Secondary component carrier, SCC), and a serving cell in the CA scenario may be a primary serving cell (primary serving cell, PCell) or a secondary serving cell (secondary serving cell, SCell).

A terminal may simultaneously receive or send data on one or more CCs based on a capability of the terminal (for example, a quantity of CCs supported by the terminal). When CA is enabled on the terminal, there is only one RRC connection between the terminal and a network device. During RRC connection establishment/re-establishment/handover, a primary serving cell provides non-access stratum (Non-access stratum, NAS) mobility information. During RRC connection re-establishment/handover, the primary serving cell provides a security input. A network side may configure an SCell for the terminal based on the capability of the terminal. A PCell and the SCell form a serving cell set. An SCell may be reconfigured, added, or removed during an RRC connection. A carrier corresponding to the PCell is a PCC, and a carrier corresponding to the SCell is an SCC. The network side can activate or deactivate a configured SCell.

In addition, a part used for uplink transmission on a carrier or in a serving cell may be understood as an uplink resource or an uplink carrier, and a part used for downlink transmission on the carrier or in the serving cell may be understood as a downlink resource or a downlink carrier. For example, in a frequency division duplex (frequency division duplex, FDD) system, a frequency domain resource used for uplink transmission on a carrier may be understood as an uplink resource or an uplink carrier, and a frequency domain resource used for downlink transmission on the carrier may be understood as a downlink resource or a downlink carrier. Alternatively, for example, in a time division duplex (time division duplex, TDD) system, a time domain resource used for uplink transmission on a carrier may be understood as an uplink resource or an uplink carrier, and a time domain resource used for downlink transmission on the carrier may be understood as a downlink resource or a downlink carrier.

(2) Bandwidth Part (Bandwidth Part, BWP)

The bandwidth part is some frequency domain resources on a carrier, a carrier bandwidth, or a system bandwidth allocated by a network device to a terminal. A size of the BWP is less than or equal to a bandwidth capability of the terminal, namely, a maximum bandwidth supported by the terminal. In addition, the BWP is contiguous frequency domain resources. For example, the BWP may include a plurality of contiguous subcarriers. For another example, the BWP may include a plurality of contiguous physical resource blocks (Physical Resource Block, PRB). The terminal can support a plurality of BWPs. In other words, the base station can configure a plurality of BWPs for the terminal. When a plurality of BWPs are configured, the BWPs may overlap or may not overlap. In addition, frequency domain resources included in different BWPs may have a same subcarrier spacing or may have different subcarrier spacings.

The subcarrier spacing is a frequency domain length of a resource element (resource element, RE), and a value of the subcarrier spacing may include 15 kHz, 30 kHz, 60 kHz, or the like.

The terminal may communicate with the network device on the BWP configured by the network device. The BWP may be classified into an uplink BWP and a downlink BWP. The terminal sends uplink data to the network device on the uplink BWP, and receives, on the downlink BWP, downlink data sent by the network device, for example, a PDSCH. The network device may configure a default BWP for the terminal. A frequency domain position of an initial BWP (or referred to as an initially activated BWP) of the terminal is a frequency domain position of a control resource set (control resource set, CORESET) of remaining system information (Remaining system information, RMSI) DCI.

(3) Discontinuous Reception (Discontinuous Reception, DRX)

In long term evolution (Long Term Evolution), when a terminal is in radio resource control (Radio Resource Control, RRC) connected (connected) mode, a DRX function is defined to reduce unnecessary power consumption of the terminal. During DRX, the terminal may be controlled to monitor a downlink control channel in some time periods and not to monitor the downlink control channel in some other time periods. Therefore, during DRX, power consumption of the terminal is reduced by controlling the terminal not to monitor the downlink control channel in some time periods. The DRX mechanism defined in LTE may be still used in a 5G system.

For example, the downlink control channel in the embodiments of this application may be a physical downlink control channel (Physical downlink control channel, PDCCH).

In RRC connected mode, the terminal is configured to perform discontinuous reception. During DRX, behavior of monitoring the downlink control channel by the terminal can be controlled.

Specifically, during DRX, the terminal may be controlled to monitor a downlink control channel scrambled by using identification information.

For example, the identification information may be any one of the following: a cell radio network temporary identifier (Cell Radio Network Temporary Identity, C-RNTI), a configured scheduling radio network temporary identifier (configured scheduling RNTI, CS-RNTI), an interruption radio network temporary identifier (interruption RNTI, INT-RNTI), a slot format indication radio network temporary identifier (slot format indication RNTI, SFI-RNTI), a semi-persistent channel state information radio network temporary identifier (semi-persistent CSI RNTI, SP-CSI-RNTI), a transmit power control radio network temporary identifier (transmit power control RNTI. TPC-PUCCH-RNTI), a transmit power control physical uplink shared channel radio network temporary identifier (transmit power control physical uplink shared channel RNTI. TPC-PUSCH-RNTI), and a transmit power control sounding reference signal radio network temporary identifier (transmit power control sounding reference signal RNTI, TPC-SRS-RNTI).

Scrambling a downlink control channel by using the RNTI may also be understood as scrambling DCI by using the RNTI. The downlink control channel may carry the DCI. Correspondingly, scrambling the DCI may be scrambling a CRC parity bit by using the radio network temporary identifier after cyclic redundancy check (Cyclic Redundancy Check, CRC) attachment is performed on the DCI, or may be scrambling, by using the RNTI, a sequence obtained after CRC attachment is performed on the DCI.

In NR. DRX operations are controlled during the RRC connection by using one or more of the following parameters:

drx-onDurationTimer: duration starting from a DRX cycle (cycle) (a name of the timer is onDurationTimer in LTE);

drx-SlotOffset: a delay before the drx-onDurationTimer is started;

drx-StartOffset: a start subframe of the DRX cycle (a name is drxStartOffset in LTE);

drx-InactivityTimer: duration after a downlink control channel occasion, where a downlink control channel on the downlink control channel occasion indicates initial uplink (Uplink. UL) transmission or downlink (Downlink, DL) transmission to a terminal;

drx-RetransmissionTimerDL (per DL HARQ process): maximum duration until downlink retransmission is received (a name of the timer is drx-Retransmission-Timer in LTE);

drx-RetransmissionTimerUL (per UL HARQ process): maximum duration until a grant (grant) for uplink retransmission is received the maximum duration until a grant for UL retransmission is received (a name of the timer is drx-ULRetransmissionTimer in LTE);

drx-LongCycle: a long DRX cycle (a name is longDRX-Cycle in LTE);

drx-ShortCycle (optional): a short DRX cycle (a name is shortDRX-Cycle in LTE); and drx-ShortCycleTimer (optional): duration for which a terminal uses a short DRX cycle (a name is drxShortCycleTimer in LTE).

When the DRX cycle is configured, an active time (Active time) includes the following:
(1) The drx-onDurationTimer or the drx-InactivityTimer or the drx-RetransmissionTimer or the drx-ULRetransmissionTimer or an ra-ContentionResolutionTimer is running.
(2) A scheduling request (Scheduling Request, SR) is sent and is pending (pending).
(3) After a random access response (Random Access Response. RAR) is successfully received, a downlink control channel that indicates initial transmission and that is scrambled by using the C-RNTI is not received. The RAR is a response to a random access preamble that is not selected by the terminal from contention-based random access preambles.

When the terminal is in the active time, the terminal needs to monitor the downlink control channel.

Figure 7:
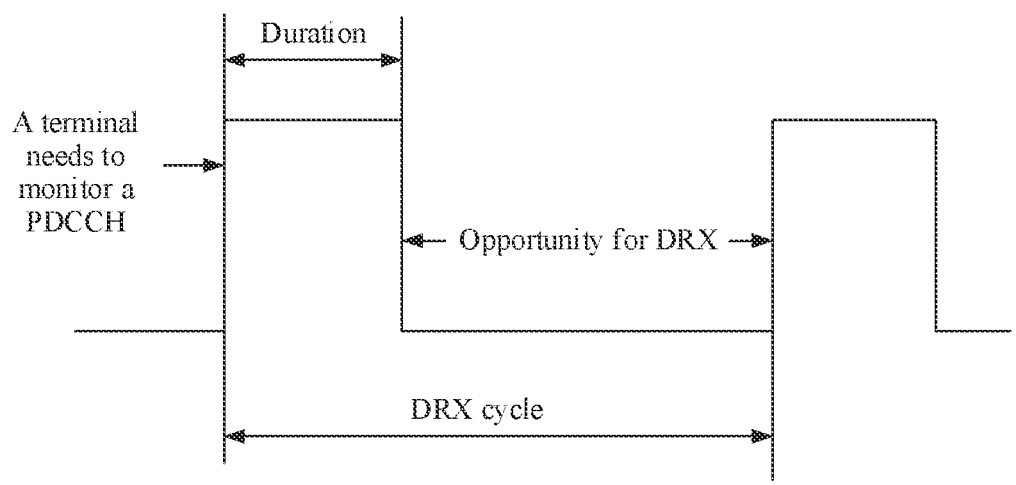
FIG. 7 is a schematic diagram of DRX according to an embodiment of this application.

A DRX cycle is shown in FIG. 7. On duration (On Duration) is periodically repeated, and the DRX cycle is a cycle of on duration repetition. The drx-onDurationTimer starts at a start moment of the on duration. Duration of the drx-onDurationTimer is equal to the on duration. An opportunity for DRX (Opportunity for DRX) is an inactive time.

Each time initial transmission is scheduled for the terminal, the drx-InactivityTimer is started (or restarted). Then, the terminal monitors a downlink control channel until the timer expires. The drx-InactivityTimer specifies a time length for which the downlink control channel for scheduling initial transmission is continuously monitored after the terminal successfully decodes the downlink control channel.

When the terminal monitors a downlink control channel of a hybrid automatic repeat request (hybrid automatic repeat request, HARQ) of data, because there is no fixed time sequence relationship between previous transmission and retransmission, a time window is defined for each of an uplink HARQ process and a downlink HARQ process (process), so that the terminal is allowed to monitor a downlink control channel for uplink transmission or a downlink control channel for downlink transmission after the time window starting from previous uplink or downlink transmission. The time window may be implemented by using a timer. Each uplink HARQ process and each downlink HARQ process each may correspond to one timer.

For example, the timer corresponding to the downlink HARQ process is a HARQ RTT (Round Trip Time, RTT) timer or drx-HARQ-RTT-TimerDL, and the timer corresponding to the uplink HARQ process is a UL HARQ RTT timer or drx-HARQ-RTT-TimerUL. For the uplink HARQ process, when the corresponding timer expires, a corresponding uplink retransmission timer (drx-RetransmissionTimerUL, or referred to as drx-ULRetransmissionTimer) is started. For the downlink HARQ process, when the corresponding timer expires, a corresponding downlink retransmission timer (drx-RetransmissionTimerDL, or referred to as drx-RetransmissionTimer) is started.

The UE may listen on a PDCCH when the drx-RetransmissionTimerUL or the drx-RetransmissionTimerDL is running. The drx-RetransmissionTimerUL may be defined as maximum duration until a grant for uplink retransmission is received (the maximum duration until a grant for UL retransmission is received). The drx-RetransmissionTimerDL may be defined as maximum duration until a grant for downlink retransmission is received (the maximum duration until a grant for DL retransmission is received).

As shown in FIG. 1(b), when an interval between an earliest possible start position of a time domain resource of a downlink data channel and a time domain position of DCI for scheduling the downlink data channel is 0, the terminal buffers data and decodes the DCI starting from the time domain position of the DCI and until the DCI is obtained through decoding.

As shown in FIG. 1(c), when an interval between an earliest possible start position of a time domain resource of a downlink data channel and a time domain position of DCI for scheduling the downlink data channel is greater than a time period in which the terminal obtains the DCI through decoding, the terminal does not need to buffer data after the time domain position of the DCI and may directly receive, based on an indication of the DCI, the downlink data channel scheduled by the DCI. In a process in FIG. 1(c), the terminal may disable different modules in a time period after the time domain position of the DCI and before the start position of the time domain resource of the downlink data channel based on a value of the interval between the time domain position of the DCI and the start position of the time domain resource of the downlink data channel. More disabled modules indicate lower power consumption of the terminal. Generally, a larger time domain interval between the start position of the time domain resource of the downlink data channel and the time domain position of the DCI indicates lower power consumption of the terminal in a time period between the start position of the time domain resource of the downlink data channel and the time domain position of the DCI. Therefore, power consumption of the terminal shown in FIG. 1(c) is less than power consumption of the terminal shown in FIG. 1(b).

In the embodiments of this application, a communications method may be performed by the terminal, or may be performed by a chip applied to the terminal. It may be understood that all processes performed by the terminal may also be performed by the chip applied to the terminal, and all processes performed by a network device may also be performed by a chip applied to the network device. This is described herein, and details are not described subsequently. Similarly, the same description may also be used for an execution body in another method. The following embodiments are described by using an example in which one communications method is performed by the terminal, and the other communications method is performed by the network device.

Embodiment 1

Figure 8:
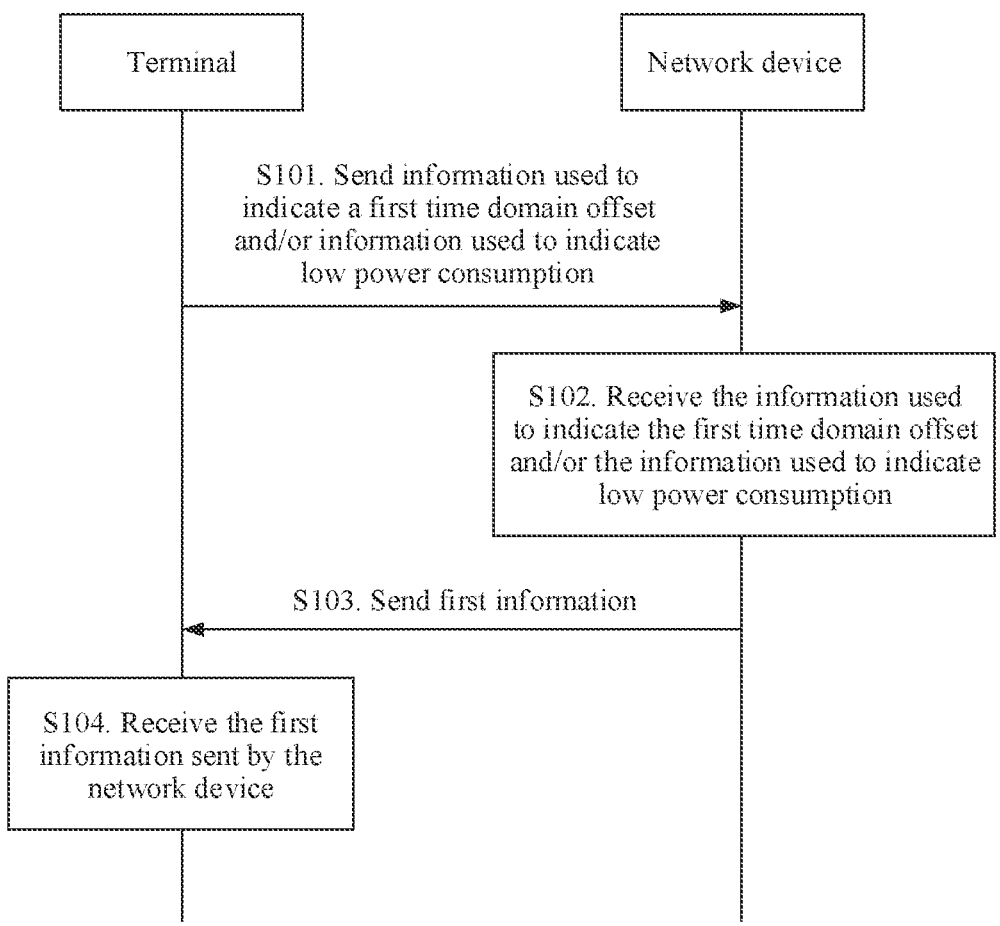
FIG. 8 is a schematic diagram 1 of a communication process according to an embodiment of this application.

FIG. 8 is a schematic flowchart of a communications method. The method includes the following steps.

S101. A terminal sends, to a network device, information used to indicate a first time domain offset and/or information used to indicate low power consumption.

Specifically, the terminal sends, to the network device, the information used to indicate the first time domain offset and/or the information used to indicate low power consumption, so that the network device configures a first time domain resource allocation indicating a relatively large time domain offset (for example, a time domain offset greater than or equal to a minimum time domain offset expected by the terminal); or the terminal notifies the network device that the terminal expects to use a first time domain resource allocation indicating a relatively large time domain offset, or the terminal notifies the network device of a time domain offset or a time domain offset increment expected by the terminal, or notifies the network device that the terminal expects to reduce power consumption.

For example, S101 may include the following implementation: The terminal sends, to the network device, the information used to indicate the first time domain offset; or the terminal sends, to the network device, the information used to indicate low power consumption; or the terminal sends, to the network device, the information used to indicate the first time domain offset and the information used to indicate low power consumption.

For example, S101 may include the following implementation: The terminal sends, to the network device, the information used to indicate the first time domain offset and/or information used to indicate a power consumption preference; or the terminal sends, to the network device, the information used to indicate the first time domain offset and/or information used to indicate that the terminal expects a relatively large time domain offset. S101 may alternatively be: The terminal sends, to the network device, the information used to indicate the first time domain offset and/or information used to indicate that the terminal expects to increase a time domain offset.

The information used to indicate the first time domain offset and the information used to indicate low power consumption may be sent to the network device in a same message (for example, a first message), or may be sent to the network device in different messages (for example, the information used to indicate the first time domain offset is carried in a first message, and the information used to indicate low power consumption is carried in a second message).

For example, the first message or the second message may be capability information of the terminal (for example, UECapabilityInformation), or the first message or the second message is assistance information of the terminal (for example, UEAssistanceInformation). In addition, the first message or the second message may alternatively be an RRC message, a medium access control control element (Medium access control Control Elements, MAC CE), or DCI.

It should be noted that, in this application, information used to indicate A may include A, or information used to indicate A may be indication information that corresponds to A. and the indication information is used to indicate A. This is described herein. For related descriptions in the following, refer to the description herein.

For example, the information used to indicate the first time domain offset may include a first time domain offset 1011. Alternatively, the information used to indicate the first time domain offset may be first indication information, and the first indication information is used to determine a first time domain offset 1011.

For example, the information used to indicate the first time domain offset may include a time domain offset 1. For another example, if the first indication information is an index 1, the information used to indicate the first time domain offset may be the index 1, and the index 1 corresponds to the time domain offset 1.

For example, the information used to indicate low power consumption may include low power consumption information, or may be indication information used to indicate low power consumption. The information used to indicate low power consumption is used to indicate that the terminal expects to reduce power consumption, or the terminal prefers (or prefers) a configuration that is optimized for power consumption reduction.

For example, the second message includes a power preference indication (powerPrefindication) information element (information element, IE), a value of the powerPrefindication is set to low power consumption (lowPowerConsumption), and the lowPowerConsumption indicates that the terminal expects to reduce power consumption.

Therefore, S101 may be replaced with the following step: The terminal may send the first time domain offset 1011 and/or the low power consumption information to the network device. Alternatively, S101 may be replaced with the following step: The terminal sends, to the network device, the first indication information and/or the information used to indicate low power consumption. Alternatively, S101 may be replaced with the following step: The terminal sends, to the network device, the first time domain offset 1011 and/or the information used to indicate low power consumption. Alternatively, S101 may be replaced with the following step: The terminal sends the first indication information and/or the low power consumption information to the network device.

For example, the first time domain offset 1011 may be at least one of the minimum time domain offset expected by the terminal, a maximum time domain offset expected by the terminal, or the time domain offset increment expected by the terminal.

For example, a value of the time domain offset increment expected by the terminal may be a positive number or a negative number. When the time domain offset increment expected by the terminal is a positive number, it indicates that the terminal expects to increase a time domain offset. Increasing a time domain offset is applicable to a case in which the terminal expects to reduce power consumption.

When the time domain offset increment expected by the terminal is a negative number, it indicates that the terminal expects to decrease a time domain offset. Decreasing a time domain offset is applicable to a case in which the terminal expects to reduce a scheduling delay.

A time domain offset C indicated by a current time domain resource allocation of the terminal plus the time domain offset increment expected by the terminal is greater than or equal to the minimum time domain offset expected by the terminal. In other words, the time domain offset increment expected by the terminal is obtained by subtracting the time domain offset C indicated by the current time domain resource allocation of the terminal from the minimum time domain offset expected by the terminal. It may be understood that the time domain offset increment expected by the terminal may include one or more time domain offset increments.

Alternatively, a minimum time domain offset in a current time domain resource allocation table/list of the terminal plus the time domain offset increment expected by the terminal is greater than or equal to the minimum time domain offset expected by the terminal.

Alternatively, a time domain offset C indicated by a current time domain resource allocation of the terminal plus the time domain offset increment expected by the terminal is less than or equal to the maximum time domain offset expected by the terminal. In other words, the time domain offset increment expected by the terminal is obtained by subtracting the time domain offset C indicated by the current time domain resource allocation of the terminal from the maximum time domain offset expected by the terminal. It may be understood that the time domain offset increment expected by the terminal may include one or more time domain offset increments. Alternatively, a maximum time domain offset in a current time domain resource allocation table/list of the terminal plus the time domain offset increment expected by the terminal is less than or equal to the maximum time domain offset expected by the terminal.

It may be understood that, in this embodiment of this application, the value of the time domain offset increment expected by the terminal may be a positive number or a negative number.

Specifically, when the time domain offset C indicated by the current time domain resource allocation of the terminal is greater than the maximum time domain offset expected by the terminal, the value of the time domain offset increment expected by the terminal is a negative number. When the time domain offset C indicated by the current time domain resource allocation of the terminal is less than the minimum time domain offset expected by the terminal, the value of the time domain offset increment expected by the terminal is a positive number.

It should be noted that, when the terminal needs a relatively small time domain offset (for example, a time domain offset less than or equal to the maximum time domain offset expected by the terminal), the information used to indicate low power consumption in S101 may be replaced with information used to indicate a low scheduling delay, or may be replaced with information used to indicate that the terminal expects a relatively small time domain offset. When the terminal needs the first time domain resource allocation that meets both a low scheduling delay and low power consumption, the terminal may send, to the network device, one or more of the information used to indicate the first time domain offset, the information used to indicate low power consumption, or the information used to indicate a low scheduling delay. For example, the terminal sends, to the network device, the minimum time domain offset expected by the terminal and the maximum time domain offset expected by the terminal. Alternatively, the terminal sends, to the network device, the information used to indicate low power consumption and the information used to indicate a low scheduling delay.

The current time domain resource allocation may be preconfigured for the terminal, or may be predefined, or may be sent by the network device to the terminal. This is not limited in this embodiment of this application.

In this embodiment of this application, a time unit of a time domain offset or a time domain offset increment may be a slot (slot), a symbol (Symbol), a mini-slot, a subframe, a millisecond, or the like.

S102. The network device receives the information used to indicate the first time domain offset and/or the information used to indicate low power consumption that are/is sent by the terminal.

S103. The network device sends first information to the terminal, where the first information is used to determine the first time domain resource allocation, or the first information is used to determine a time domain offset indicated by the first time domain resource allocation.

For example, the first information may be an RRC message, and may be specifically an RRC reconfiguration message. The first information may alternatively be a MAC CE or DCI. The first information may alternatively be an RRC connection establishment message or an RRC connection re-establishment message.

Specifically, the first time domain resource allocation includes one or more time domain resource allocations.

In this embodiment of this application, when the first time domain resource allocation includes one or more time domain resource allocations, the first time domain resource allocation may indicate one or more third time domain offsets $1013$. Specifically, each of the one or more time domain resource allocations indicates one third time domain offset $1013$.

In this embodiment of this application, one time domain resource allocation may include or indicate a slot offset $K_0$ and/or a start symbol. The slot offset may be an offset relative to a slot in which DCI for scheduling a downlink data channel is located. The start symbol may be a start symbol of a slot in which the downlink data channel is located.

It may be understood that a time domain resource allocation may indicate an offset of a time domain position of a downlink data channel relative to a time domain position of DCI for scheduling the downlink data channel, and the terminal may determine, based on the time domain resource allocation, the offset of the time domain position of the downlink data channel relative to the time domain position of the DCI for scheduling the downlink data channel. Alternatively, a time domain resource allocation may indicate an offset of a start position of a time domain resource of a downlink data channel relative to a start position of a time domain resource of DCI for scheduling the downlink data channel, and the terminal may determine, based on the time domain resource allocation, the offset of the start position of the time domain resource of the downlink data channel relative to the start position of the time domain resource of the DCI for scheduling the downlink data channel. Alternatively, a time domain resource allocation may indicate an offset of a slot in which a downlink data channel is located relative to a slot in which DCI for scheduling the downlink data channel is located, and the terminal may determine, based on the time domain resource allocation, the offset of the slot in which the downlink data channel is located relative to the slot in which the DCI for scheduling the downlink data channel is located. Alternatively, a time domain resource allocation may indicate an offset of a start symbol of a downlink data channel relative to a start of a slot in which DCI for scheduling the downlink data channel is located, and the terminal may determine, based on the time domain resource allocation, the offset of the start symbol of the downlink data channel relative to the start of the slot in which the DCI for scheduling the downlink data channel is located. Alternatively, a time domain resource allocation may indicate an offset of a start symbol of a downlink data channel relative to a start of a slot in which the downlink data channel is located, and the terminal may determine, based on the time domain resource allocation, the offset of the start symbol of the downlink data channel relative to the start of the slot in which the downlink data channel is located.

It should be noted that a time domain offset indicated by a time domain resource allocation in this embodiment of this application may be a time domain offset included in the time domain resource allocation. This is described herein, and details are not described subsequently.

For example, the third time domain offset $1013$ indicated by the first time domain resource allocation and the first time domain offset $1011$ meet at least one of Case 1 to Case 5:

Case 1: When the first time domain offset $1011$ is the minimum time domain offset expected by the terminal, the third time domain offset $1013$ is greater than or equal to the first time domain offset $1011$. The third time domain offset $1013$ is limited to being greater than or equal to the minimum time domain offset expected by the terminal. In this way, an interval between a time domain position of DCI for scheduling a downlink data channel and a start position of a time domain resource of the downlink data channel can be increased, thereby reducing power consumption of the terminal.

Case 2: When the first time domain offset 1011 is the time domain offset increment expected by the terminal, the third time domain offset 1013 is greater than or equal to a sum of the first time domain offset 1011 and a fourth time domain offset 1014. The fourth time domain offset 1014 is a time domain offset indicated by a second time domain resource allocation of the terminal.

Case 3: When the first time domain offset 1011 is the minimum time domain offset expected by the terminal and the maximum time domain offset expected by the terminal, the third time domain offset 1013 is greater than or equal to the minimum time domain offset expected by the terminal, and the third time domain offset 1013 is less than or equal to the maximum time domain offset expected by the terminal. In this way, not only power consumption of the terminal can be reduced, but also a scheduling delay can be reduced.

Case 4: When the first time domain offset 1011 is the maximum time domain offset expected by the terminal, the third time domain offset 1013 is less than or equal to the maximum time domain offset expected by the terminal. The third time domain offset 1013 is limited to being less than or equal to the maximum time domain offset expected by the terminal. In this way, a scheduling delay can be reduced.

It should be noted that, if the terminal sends, to the network device, the maximum time domain offset expected by the terminal, the terminal may send information used to indicate a low delay or information used to indicate a delay preference, or replace the information used to indicate low power consumption with information used to indicate that the terminal does not need to reduce power consumption in S101.

Case 5: When the first time domain offset 1011 is the time domain offset increment expected by the terminal, the third time domain offset 1013 is less than or equal to a sum of the first time domain offset 1011 and a fourth time domain offset 1014. The fourth time domain offset 1014 is a time domain offset indicated by a second time domain resource allocation of the terminal.

A difference between Case 2 and Case 5 lies in that Case 2 is applicable to a case in which the fourth time domain offset 1014 is less than the minimum time domain offset expected by the terminal, and Case 5 is applicable to a case in which the fourth time domain offset 1014 is greater than the maximum time domain offset expected by the terminal. In Case 2, the third time domain offset 1013 obtained based on the fourth time domain offset 1014 and the time domain offset increment expected by the terminal may be greater than or equal to the minimum time domain offset expected by the terminal. In Case 5, the third time domain offset 1013 obtained based on the fourth time domain offset 1014 and the time domain offset increment expected by the terminal may be less than or equal to the maximum time domain offset expected by the terminal.

It should be noted that the first time domain resource allocation sent by the network device to the terminal may alternatively not meet the third time domain offset 1013 in Case 1 to Case 5. The first time domain resource allocation includes a plurality of time domain resource allocations, and the third time domain offset 1013 indicated by the first time domain resource allocation may include a third time domain offset 1013 greater than or equal to the first time domain offset 1011, or may include a third time domain offset 1013 less than the first time domain offset 1011.

S104. The terminal receives the first information sent by the network device.

According to the communications method provided in this embodiment of this application, a time domain resource allocation usually carries a start position of a time domain resource of a downlink data channel. Therefore, the terminal sends, to the network device, the information used to indicate the first time domain offset and/or the information used to indicate low power consumption, so that there is a relatively long interval between a time domain position of DCI and a start position of a time domain resource that is included/indicated in the first time domain resource allocation configured by the network device for the terminal or the first time domain resource allocation that the network device indicates the terminal to determine. In actual implementation of the terminal, the terminal may disable different modules in a time period after the time domain position of the DCI and before the start position of the time domain resource of the downlink data channel based on a value of the interval between the time domain position of the DCI and the start position of the time domain resource of the downlink data channel. More disabled modules indicate lower power consumption of the terminal. Usually, a longer time domain interval between the start position of the time domain resource of the downlink data channel and the time domain position of the DCI indicates lower power consumption of the terminal in a time period between the start position of the time domain resource of the downlink data channel and the time domain position of the DCI.

After receiving the information used to indicate the first time domain offset and/or the information used to indicate low power consumption, the network device may determine the first time domain resource allocation, and then send the first time domain resource allocation to the terminal by using the first information. In addition, after receiving the information used to indicate the first time domain offset and/or the information used to indicate low power consumption, the network device may indicate, by using the first information, the terminal to determine the first time domain resource allocation. In different cases, specific implementations are different, and are separately described in the following embodiments.

Example 1: The first information indicates the terminal to determine the first time domain resource allocation.

Specifically, the terminal has a second time domain resource allocation, and the second time domain resource allocation may be predefined (for example, a time domain resource allocation table defined in a standard protocol, or a time domain resource allocation corresponding to each row in a time domain resource allocation table defined in a standard protocol), or may be obtained by the terminal from the network device.

Figure 9:
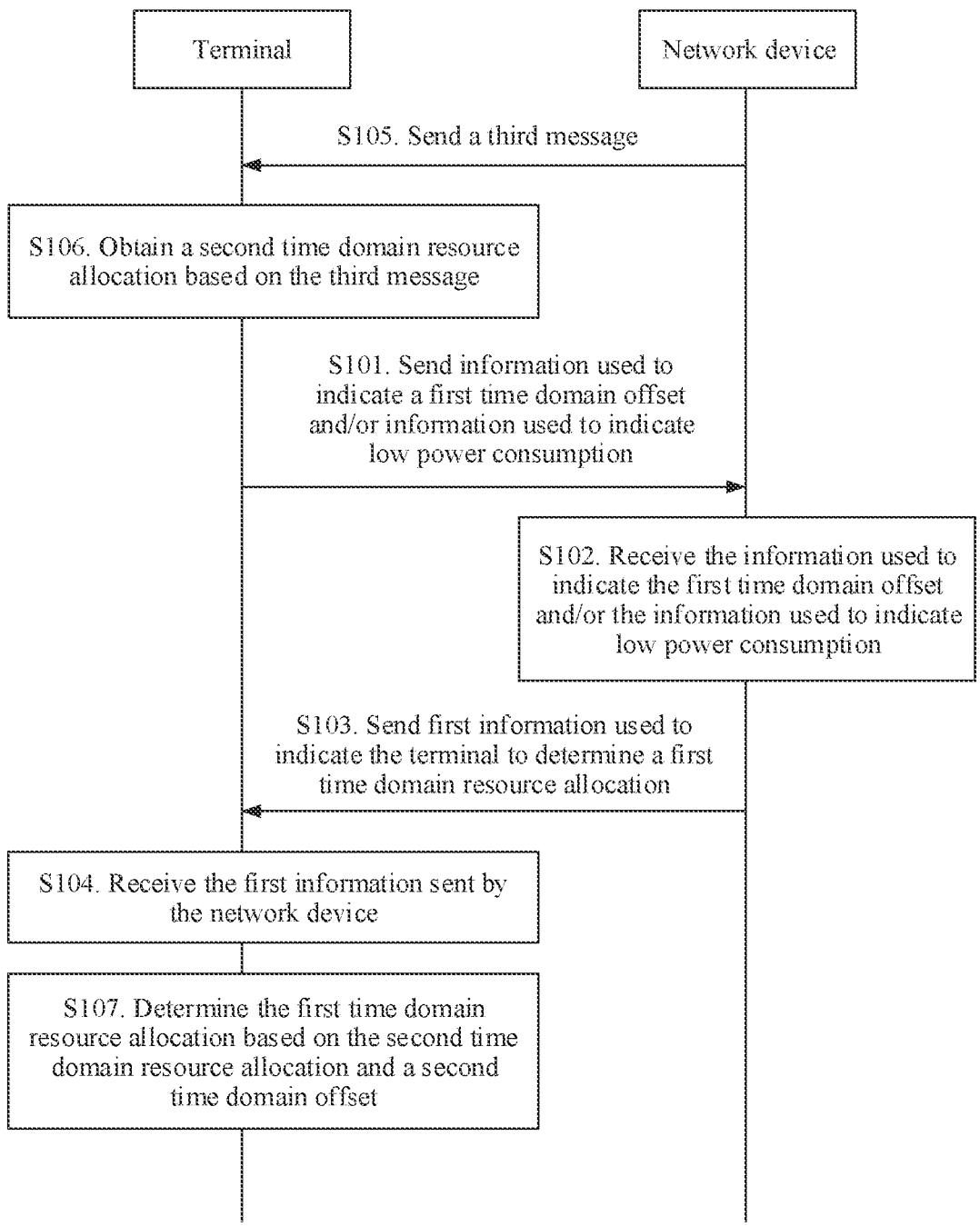
FIG. 9 is a schematic diagram 2 of a communication process according to an embodiment of this application.

When the second time domain resource allocation is obtained by the terminal from the network device, as shown in FIG. 9, the method provided in this embodiment of this application further includes the following steps:

S105. The network device sends a third message to the terminal, where the third message includes the second time domain resource allocation, or the third message is used to indicate the second time domain resource allocation.

S106. The terminal obtains the second time domain resource allocation based on the third message.

For example, S106 may be implemented in the following manner: Parse the third message to obtain the second time domain resource allocation included in the third message. Alternatively, S106 may be implemented in the following manner: Determine, based on the third message, information used to indicate a time domain resource allocation, and determine, based on the information used to indicate the time domain resource allocation, the second time domain resource allocation indicated by the information.

Optionally, after performing S106, if the terminal determines that the fourth time domain offset 1014 indicated by the second time domain resource allocation does not meet a preset condition, the terminal may perform S101.

For example, the preset condition includes one or more of the following:

All fourth time domain offsets 1014 indicated by the second time domain resource allocation are less than the minimum time domain offset expected by the terminal, a quantity of fourth time domain offsets 1014 that are in one or more fourth time domain offsets indicated by the second time domain resource allocation and that are less than the minimum time domain offset expected by the terminal is greater than a first threshold, all fourth time domain offsets 1014 indicated by the second time domain resource allocation are greater than the maximum time domain offset expected by the terminal, a quantity of fourth time domain offsets 1014 that are in one or more fourth time domain offsets indicated by the second time domain resource allocation and that are greater than the maximum time domain offset expected by the terminal is greater than a first threshold, or the fourth time domain offset 1014 indicated by the second time domain resource allocation is not between the maximum time domain offset expected by the terminal and the minimum time domain offset expected by the terminal.

The first threshold may be determined by the terminal, or may be configured by the network device for the terminal. This is not limited herein.

In a possible implementation, as shown in FIG. 9, S103 may be specifically implemented in the following manner: The network device sends, to the terminal, the first information used to indicate the terminal to determine the first time domain resource allocation.

For example, the first information may include second indication information, and the second indication information is used to indicate the terminal to determine the first time domain resource allocation. Alternatively, the first information may include information used to indicate the second time domain offset 1012. Alternatively, the first information includes second indication information and information used to indicate the second time domain offset 1012. In this way, after receiving the first information, the terminal may determine the first time domain resource allocation.

Certainly, when the network device does not send, to the terminal, the second indication information and the information used to indicate the second time domain offset 1012, the terminal may also determine the first time domain resource allocation. In this case, the terminal may obtain the first time domain resource allocation based on the second time domain resource allocation and the predefined second time domain offset 1012 or based on the first time domain offset.

As shown in FIG. 9, the method provided in this embodiment of this application further includes the following step:

S107. The terminal determines the first time domain resource allocation based on the second time domain resource allocation and the second time domain offset 1012.

Specifically, a time domain offset indicated by the second time domain resource allocation is different from a time domain offset indicated by the first time domain resource allocation. That the time domain offset indicated by the second time domain resource allocation is different from the time domain offset indicated by the first time domain resource allocation may mean that a slot offset indicated by the first time domain resource allocation is different from a slot offset indicated by the second time domain resource allocation; or a start symbol indicated by the first time domain resource allocation is different from a start symbol indicated by the second time domain resource allocation; or a start symbol indicated by the first time domain resource allocation is different from a start symbol indicated by the second time domain resource allocation, and a slot offset indicated by the first time domain resource allocation is different from a slot offset indicated by the second time domain resource allocation.

For example, the first time domain resource allocation includes a slot offset 1 and the third symbol serving as a start symbol, and the second time domain resource allocation includes a slot offset 0 and the second symbol serving as a start symbol.

For example, w % ben the first information includes the second indication information but does not include the information used to indicate the second time domain offset 1012, the second time domain offset 1012 may be a predefined time domain offset, or the second time domain offset 1012 is the first time domain offset 1011.

For example, when the first information includes the information used to indicate the second time domain offset 1012, the second time domain offset 1012 is a time domain offset indicated by the first information, or the second time domain offset 1012 is a time domain offset increment indicated by the first information.

In addition, this embodiment of this application further includes: The network device determines the second time domain offset 1012 based on the information used to indicate the first time domain offset and/or the information used to indicate low power consumption.

Manner a: When the information used to indicate the first time domain offset and received by the network device is the maximum time domain offset expected by the terminal, if one or more fourth time domain offsets 1014 indicated by the second time domain resource allocation are greater than the maximum time domain offset expected by the terminal, the network device may determine the second time domain offset 1012 based on the one or more fourth time domain offsets 1014 and the maximum time domain offset expected by the terminal. In this case, the second time domain offset 1012 includes one or more time domain offset increments. Specifically, the network device may obtain the second time domain offset 1012 by subtracting the maximum time domain offset expected by the terminal from each of the one or more fourth time domain offsets 1014.

For example, a time domain offset is expressed in a start symbol. It is assumed that the maximum time domain offset expected by the terminal is three symbols. In this case, if the fourth time domain offset 1014 is five symbols, the network device may determine that the second time domain offset 1012 is two symbols. If the fourth time domain offset 1014 is six symbols, the network device may determine that the second time domain offset 1012 is three symbols.

In addition, if a difference between a largest fourth time domain offset 1014 in the one or more fourth time domain offsets 1014 and the maximum time domain offset expected by the terminal is greater than a smallest fourth time domain offset 1014 in the one or more fourth time domain offsets 1014, the network device may determine that the second time domain offset 1012 is the difference between the largest fourth time domain offset 1014 and the maximum time domain offset expected by the terminal.

For example, a time domain offset is expressed in a slot offset. If the maximum time domain offset expected by the terminal is one slot, and the fourth time domain offset 1014 is zero slots, the network device may determine that the second time domain offset 1012 is one slot.

For example, a time domain offset is expressed in a start symbol. It is assumed that the maximum time domain offset expected by the terminal is M symbols. In this case, if the fourth time domain offset 1014 is N symbols, the network device may determine that the second time domain offset 1012 is two symbols. If the fourth time domain offset 1014 is six symbols, the network device may determine that the second time domain offset 1012 is three symbols.

It should be noted that the maximum time domain offset expected by the terminal and sent by the terminal may include both a slot offset $K_0$ and a start symbol offset.

For example, the maximum slot offset $K_0$ expected by the terminal is one slot, and the start symbol is the third symbol (for example, a symbol 2). If the fourth time domain offset 1014 is two symbols (for example, a symbol 1), and the fourth time domain offset 1014 is located in a slot 0, the network device may determine that the second time domain offset 1012 is one slot and one symbol.

Specifically, the slot in this embodiment of this application may include 14 symbols, for example, symbols 0 to 13. One slot may alternatively include 12 symbols or another quantity of symbols. This is not limited in this application.

Manner b: When the network device receives the minimum time domain offset expected by the terminal, if one or more fourth time domain offsets 1014 indicated by the second time domain resource allocation are less than the minimum time domain offset expected by the terminal, the network device may determine the second time domain offset 1012 based on a smallest fourth time domain offset 1014 in the one or more fourth time domain offsets 1014 and the minimum time domain offset expected by the terminal. In this case, the second time domain offset 1012 is a time domain offset increment. Certainly, the network device may alternatively determine the second time domain offset 1012 based on each of the one or more fourth time domain offsets 1014 and the minimum time domain offset expected by the terminal.

Specifically, the network device may obtain the second time domain offset 1012 by subtracting the minimum fourth time domain offset 1014 from the minimum time domain offset expected by the terminal.

When the network device receives the minimum time domain offset expected by the terminal and the maximum time domain offset expected by the terminal, for a manner in which the network device determines the second time domain offset 1012, refer to the foregoing manners a and b. Details are not described herein again.

The network device may further determine the second time domain offset 1012 based on the first time domain offset 1011. For a determining manner, refer to the foregoing manner in which the network device determines the second time domain offset 1012 based on the minimum time domain offset expected by the terminal. For example, when the first time domain offset 1011 is the minimum time domain offset expected by the terminal, the network device may determine the second time domain offset 1012 in the foregoing manner b.

Manner c: When the information used to indicate the first time domain offset and received by the network device is the time domain offset increment expected by the terminal, the network device may determine that the second time domain offset 1012 is the time domain offset increment expected by the terminal.

Manner d: When the information used to indicate the first time domain offset and received by the network device is the information used to indicate low power consumption/the information used to indicate a low scheduling delay, the network device may determine that the second time domain offset 1012 is the predefined time domain offset.

For example, S107 may be specifically implemented in the following manners:

Manner 1-1: The first time domain resource allocation includes a target time domain resource allocation in the second time domain resource allocation. In other words, the terminal may select the target time domain resource allocation from the second time domain resource allocation based on the first information.

In a possible implementation, a fifth time domain offset 1015 indicated by the target time domain resource allocation is greater than or equal to the second time domain offset 1012.

In an example A, the fifth time domain offset 1015 indicated by the target time domain resource allocation is greater than or equal to the second time domain offset 1012. It may also be understood that a smallest value in one or more third time domain offsets 1013 indicated by the first time domain resource allocation is the second time domain offset 1012. The example A is applicable to a case in which the second time domain offset 1012 is the minimum time domain offset expected by the terminal.

That is, the first time domain resource allocation is a universal set or a subset of the second time domain resource allocation. In other words, the first time domain resource allocation that can be used by the network device or the terminal is a time domain resource allocation, in the second time domain resource allocation, that indicates a time domain offset greater than or equal to the minimum time domain offset expected by the terminal.

For example, the second time domain resource allocation is the time domain resource allocation table shown in Table 1. For example, if the first time domain offset 1011 is seven symbols, the first time domain resource allocation may be time domain resource allocations corresponding to a row index 6, a row index 10, a row index 11, and a row index 16 in Table 1.

In another possible implementation, the fifth time domain offset 1015 is less than or equal to the second time domain offset 1012.

In an example B, the fifth time domain offset 1015 indicated by the target time domain resource allocation is less than or equal to the second time domain offset 1012. It may also be understood that a largest value in one or more third time domain offsets 1013 indicated by the first time domain resource allocation is the second time domain offset 1012. The example B is applicable to a case in which the second time domain offset 1012 is the maximum time domain offset expected by the terminal.

For example, the second time domain resource allocation is the time domain resource allocation table shown in Table 1. For example, if the first time domain offset 1011 is seven symbols, the first time domain resource allocation may be time domain resource allocations corresponding to a row index 1 to a row index 5, a row index 7 to a row index 9, and a row index 12 to a row index 15 in Table 1.

In an example C, the first time domain resource allocation that can be used by the network device or the terminal is a time domain resource allocation, in the second time domain resource allocation, that indicates a time domain offset greater than or equal to the minimum time domain offset expected by the terminal and less than or equal to the maximum time domain offset expected by the terminal. The example C is applicable to a case in which the second time domain offset 1012 is the minimum time domain offset expected by the terminal and the maximum time domain offset expected by the terminal.

For example, the second time domain resource allocation is the time domain resource allocation table shown in Table 1. For example, if the minimum time domain offset expected by the terminal is six symbols and the maximum time domain offset expected by the terminal is nine symbols, the first time domain resource allocation may be time domain resource allocations corresponding to a row index 6, a row index 7, a row index 10, and a row index 16 in Table 1.

Manner 1-2: The third time domain offset 1013 indicated by the first time domain resource allocation is obtained based on the fourth time domain offset 1014 and the second time domain offset 1012. The fourth time domain offset is a time domain offset indicated by the second time domain resource allocation.

It may be understood that the terminal may obtain the time domain offset indicated by the first time domain resource allocation, by adding the second time domain offset 1012 to the time domain offset indicated by the second time domain resource allocation.

For example, the manner 1-2 may be specifically implemented in the following manners 1-21 to 1-23:

Manner 1-21: The third time domain offset 1013 is the fourth time domain offset 1014 plus the second time domain offset 1012.

Specifically, in the manner 1-21, the third time domain offset 1013 may be greater than or equal to the minimum time domain offset expected by the terminal.

For example, the manner 1-21 is applicable to a case in which the second time domain offset 1012 is the time domain offset increment expected by the terminal or a time domain offset increment indicated by the first information.

For example, the second time domain resource allocation is the time domain resource allocation table shown in Table 1. If the second time domain offset 1012 is one slot, a time domain offset indicated by a time domain resource allocation corresponding to each row in the time domain resource allocation table shown in Table 1 plus one slot is the offset indicated by the first time domain resource allocation. It may be understood that $K_0$ in a time domain resource allocation corresponding to each row in the time domain resource allocation table shown in Table 1 plus one slot is the first time domain resource allocation. Table 2 shows the first time domain resource allocation that exists in the form of a table. It may be understood that, if the first time domain resource allocation includes a plurality of time domain resource allocations, the first time domain resource allocation may be a first time domain resource allocation list or a first time domain resource allocation table.

TABLE 2

| First time domain resource allocation table | | | | | |
|---|---|---|---|---|---|
| Row index | DRMS-TypeA-Position | PDSCH type | $K_0$ | S | L |
| 1 | 2 | Type A | 1 | 2 | 12 |
|   | 3 | Type A | 1 | 3 | 11 |
| 2 | 2 | Type A | 1 | 2 | 10 |
|   | 3 | Type A | 1 | 3 | 9 |
| 3 | 2 | Type A | 1 | 2 | 9 |
|   | 3 | Type A | 1 | 3 | 8 |
| 4 | 2 | Type A | 1 | 2 | 7 |
|   | 3 | Type A | 1 | 3 | 6 |
| 5 | 2 | Type A | 1 | 2 | 5 |
|   | 3 | Type A | 1 | 3 | 4 |
| 6 | 2 | Type B | 1 | 9 | 4 |

TABLE 2-continued

| First time domain resource allocation table | | | | | |
|---|---|---|---|---|---|
| Row index | DRMS-TypeA-Position | PDSCH type | $K_0$ | S | L |
|   | 3 | Type B | 1 | 10 | 4 |
| 7 | 2 | Type B | 1 | 4 | 4 |
|   | 3 | Type B | 1 | 6 | 4 |
| 8 | 2, 3 | Type B | 1 | 5 | 7 |
| 9 | 2, 3 | Type B | 1 | 5 | 2 |
| 10 | 2, 3 | Type B | 1 | 9 | 2 |
| 11 | 2, 3 | Type B | 1 | 12 | 2 |
| 12 | 2, 3 | Type A | 1 | 1 | 13 |
| 13 | 2, 3 | Type A | 1 | 1 | 6 |
| 14 | 2, 3 | Type A | 1 | 2 | 4 |
| 15 | 2, 3 | Type B | 1 | 4 | 7 |
| 16 | 2, 3 | Type B | 1 | 8 | 4 |

Manner 1-22: The third time domain offset 1013 is the fourth time domain offset 1014 plus the second time domain offset 1012 minus a minimum time domain offset indicated by the second time domain resource allocation.

For example, the second time domain resource allocation is the time domain resource allocation table shown in Table 1, the minimum time domain offset indicated by the second time domain resource allocation is one symbol. For example, if the second time domain offset 1012 is three symbols, a time domain offset indicated by a second time domain resource allocation corresponding to each row in the time domain resource allocation table shown in Table 1 plus three symbols minus one symbol is the time domain offset indicated by the first time domain resource allocation. It may be understood that S in the second time domain resource allocation corresponding to each row in the time domain resource allocation table shown in Table 1 plus three symbols minus one symbol is the first time domain resource allocation. This is shown in Table 3:

TABLE 3

| First time domain resource allocation table | | | | | |
|---|---|---|---|---|---|
| Row index | DRMS-TypeA-Position | PDSCH type | $K_0$ | S | L |
| 1 | 2 | Type A | 0 | 4 | 12 |
|   | 3 | Type A | 0 | 5 | 11 |
| 2 | 2 | Type A | 0 | 4 | 10 |
|   | 3 | Type A | 0 | 5 | 9 |
| 3 | 2 | Type A | 0 | 4 | 9 |
|   | 3 | Type A | 0 | 5 | 8 |
| 4 | 2 | Type A | 0 | 4 | 7 |
|   | 3 | Type A | 0 | 5 | 6 |
| 5 | 2 | Type A | 0 | 4 | 5 |
|   | 3 | Type A | 0 | 5 | 4 |
| 6 | 2 | Type B | 0 | 11 | 4 |
|   | 3 | Type B | 0 | 12 | 4 |
| 7 | 2 | Type B | 0 | 6 | 4 |
|   | 3 | Type B | 0 | 8 | 4 |
| 8 | 2, 3 | Type B | 0 | 7 | 7 |
| 9 | 2, 3 | Type B | 0 | 7 | 2 |
| 10 | 2, 3 | Type B | 0 | 11 | 2 |
| 11 | 2, 3 | Type B | 0 | 14 | 2 |
| 12 | 2, 3 | Type A | 0 | 3 | 13 |
| 13 | 2, 3 | Type A | 0 | 3 | 6 |
| 14 | 2, 3 | Type A | 0 | 4 | 4 |
| 15 | 2, 3 | Type B | 0 | 6 | 7 |
| 16 | 2, 3 | Type B | 0 | 10 | 4 |

Manner 1-23. The third time domain offset 1013 is the fourth time domain offset 1014 minus the second time domain offset 1012.

For example, the maximum time domain offset expected by the terminal is nine symbols, and the fourth time domain offsets 1014 indicated by a row index 6, a row index 10, a row index 11, and a row index 16 shown in Table 1 are all greater than nine symbols. Therefore, the terminal may subtract one second time domain offset 1012 from each of the fourth time domain offsets 1014 indicated by the row index 6, the row index 10, the row index 11, and the row index 16, so that the finally obtained third time domain offset 1013 is less than or equal to the maximum time domain offset expected by the terminal.

It should be noted that, when the network device indicates the second time domain offset 1012 to the terminal, the network device ma further send an indicator to the terminal. The indicator is used to indicate whether the terminal subtracts the second time domain offset 1012 from the fourth time domain offset 1014 or adds the second time domain offset 1012 to the fourth time domain offset 1014.

For example, when sending the information used to indicate the second time domain offset 1012, the network device further carries a first indicator or a second indicator. The first indicator is used to indicate to subtract the second time domain offset 1012 from the fourth time domain offset 1014, and the second indicator is used to indicate to add the second time domain offset 1012 to the fourth time domain offset 1014.

It should be noted that, when the terminal has the second time domain resource allocation, S101 may be omitted. To be specific, the terminal does not need to send, to the network device, the information used to indicate the first time domain offset and/or the information used to indicate low power consumption, and the network device may determine to send the first information to the terminal. The first information includes the second time domain offset, or the first information is used to indicate the second time domain offset 1012, so that the terminal determines the first time domain resource allocation based on the second time domain resource allocation and the second time domain offset 1012.

It should be noted that, regardless of whether the terminal or the network device obtains the first time domain resource allocation based on the second time domain resource allocation and the second time domain offset 1012, a start position of a time domain resource of the third time domain offset 1013 in the obtained first time domain resource allocation is different from a start position of a time domain resource of the fourth time domain offset 1014 indicated by the second time domain resource allocation, specifically, in a slot offset, or a start symbol, or both the slot offset and the start symbol.

For example, it is assumed that the fourth time domain offset 1014 includes the third symbol serving as a start symbol and a slot offset 0. In this case, if the second time domain offset 1012 indicates a time domain offset increment, a start symbol increment of the second time domain offset 1012 is three symbols, and a slot offset increment is one slot, regardless of whether the network device or the terminal determines the first time domain resource allocation, the third time domain offset 1013 indicated by the first time domain resource allocation that is finally determined by the network device or the terminal in the foregoing manner may include the sixth symbol serving as a start symbol and a slot offset 1.

All processes of determining the first time domain resource allocation by the terminal in Example 1 may also be performed by the network device.

Example 2: The network device determines the first time domain resource allocation.

Figure 10:
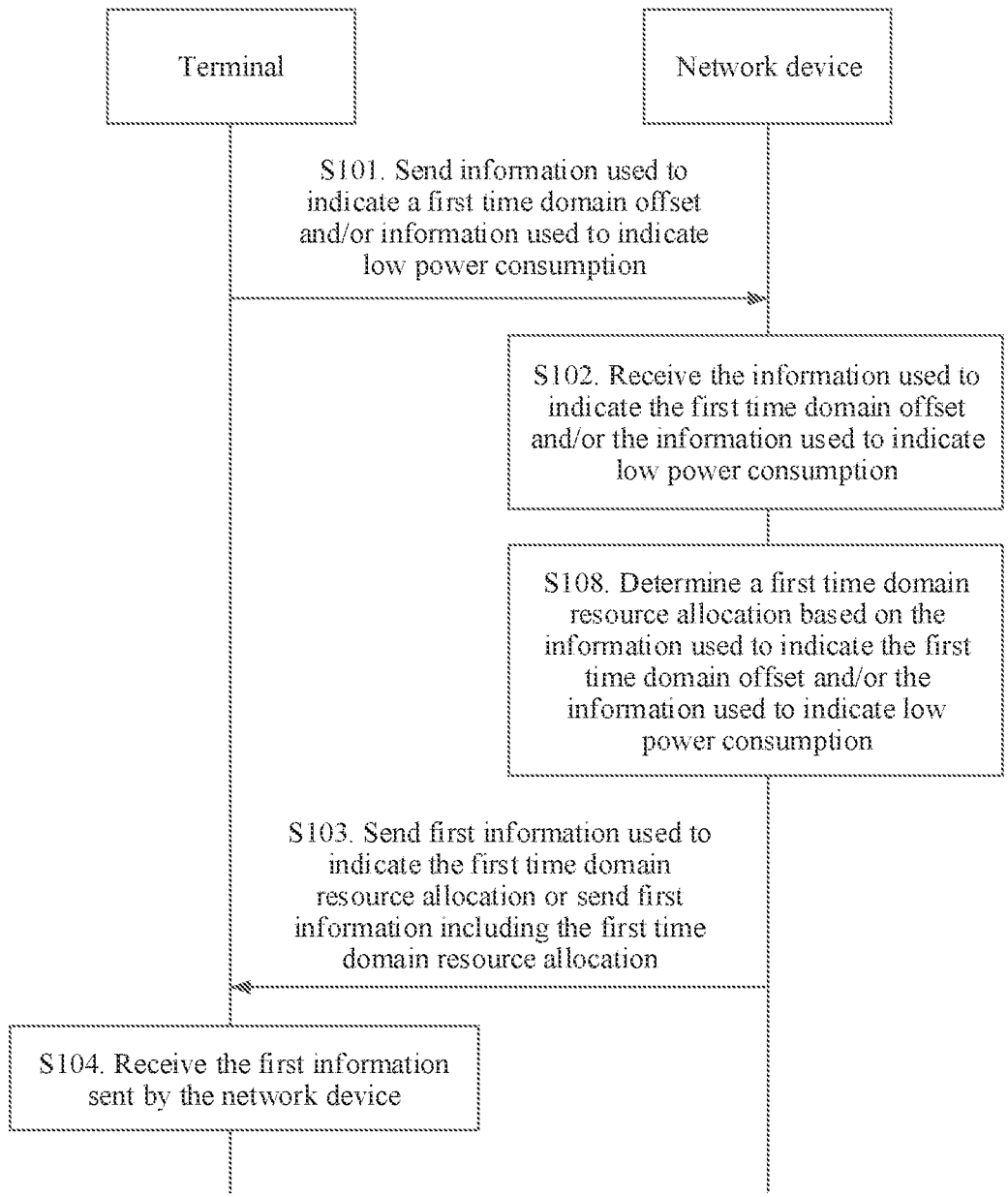
FIG. 10 is a schematic diagram 3 of a communication process according to an embodiment of this application.

In a possible implementation, as shown in FIG. 10, before S103, the method provided in this embodiment of this application further includes the following step:

S108. The network device determines the first time domain resource allocation based on the information used to indicate the first time domain offset and/or the information used to indicate low power consumption.

Correspondingly, after S103, the method provided in this embodiment of this application further includes the following step: S109. The terminal determines the first time domain resource allocation based on the first information.

For example, S108 may be implemented in the following manners:

In a first possible implementation, the network device receives the minimum time domain offset expected by the terminal and sent by the terminal, or receives the minimum time domain offset expected by the terminal and the information used to indicate low power consumption that are sent by the terminal. In this case, the network device may configure the first time domain resource allocation for the terminal based on the minimum time domain offset expected by the terminal, so that the third time domain offset 1013 indicated by the first time domain resource allocation is greater than or equal to the minimum time domain offset expected by the terminal.

It may be understood that the network device may configure the first time domain resource allocation for the terminal based on the minimum time domain offset expected by the terminal, so that a third time domain offset 1013 indicated by each of one or more time domain resource allocations included in the first time domain resource allocation is greater than or equal to the minimum time domain offset expected by the terminal.

For example, if the minimum time domain offset expected by the terminal is three symbols, the third time domain offset 1013 indicated by the first time domain resource allocation that may be selected by the network device for the terminal is greater than or equal to three symbols.

When the network device receives the maximum time domain offset expected by the terminal and sent by the terminal, or receives the maximum time domain offset expected by the terminal and the information used to indicate a low scheduling delay that are sent by the terminal, the network device may configure the first time domain resource allocation for the terminal based on the maximum time domain offset expected by the terminal, so that the third time domain offset 1013 indicated by the first time domain resource allocation is less than or equal to the maximum time domain offset expected by the terminal.

When the network device receives the maximum time domain offset expected by the terminal and the minimum time domain offset expected by the terminal that are sent by the terminal, the network device may configure the first time domain resource allocation for the terminal based on the maximum time domain offset expected by the terminal and the minimum time domain offset expected by the terminal, so that the third time domain offset 1013 indicated by the first time domain resource allocation is less than or equal to the maximum time domain offset expected by the terminal and is greater than or equal to the minimum time domain offset expected by the terminal.

Alternatively, when the network device has the second time domain resource allocation, the network device may determine the first time domain resource allocation based on the second time domain resource allocation and the second time domain offset. For a specific implementation, refer to the specific implementation in S107. Details are not described herein again.

In a second possible implementation, when the network device receives the time domain offset increment expected by the terminal and/or the information used to indicate low power consumption that are/is sent by the terminal, the network device may determine the first time domain resource allocation based on the second time domain resource allocation and the second time domain offset 1012. The second time domain resource allocation is a time domain resource allocation in the network device and the terminal.

For example, the second time domain offset 1012 may be the time domain offset increment expected by the terminal, or may be a predefined time domain offset, or may be a predefined time domain offset increment.

Manner 1: The network device may configure the first time domain resource allocation for the terminal based on the time domain offset increment expected by the terminal or the predefined time domain offset increment, so that the third time domain offset 1013 indicated by the first time domain resource allocation is greater than or equal to a sum of the fourth time domain offset 1014 indicated by the second time domain resource allocation and the time domain offset increment expected by the terminal/the predefined time domain offset increment.

It may be understood that, in this case, the first time domain resource allocation may be obtained by adding the time domain offset increment expected by the terminal or the predefined time domain offset increment to the fourth time domain offset 1014 indicated by the second time domain resource allocation.

It may be understood that the network device may configure the first time domain resource allocation for the terminal based on the time domain offset increment expected by the terminal or the predefined time domain offset increment, so that a third time domain offset 1013 indicated by each time domain resource allocation included in the first time domain resource allocation can be greater than or equal to a sum of a smallest time domain offset indicated by the second time domain resource allocation and the time domain offset increment expected by the terminal/the predefined time domain offset increment.

The network device may further determine the first time domain resource allocation based on the first time domain offset 1011. For a determining manner, refer to the foregoing manner in which the network device determines the first time domain resource allocation based on the minimum time domain offset expected by the terminal or the time domain offset increment expected by the terminal.

In Example 2, the first information may include the first time domain resource allocation, or the first information is used to indicate the first time domain resource allocation. In this case, S109 may be specifically implemented in the following manner: The terminal may determine the first time domain resource allocation from the first information.

In a third possible implementation, the first information is specifically used to indicate the terminal to hand over to a first frequency domain resource (for example, a BWP). In this case, S109 may be specifically implemented in the following manner: The terminal determines a time domain resource allocation corresponding to the first frequency domain resource as the first time domain resource allocation.

It may be understood that the network device may configure a plurality of frequency domain resources for the terminal, and each of the plurality of frequency domain resources corresponds to one time domain resource allocation. The network device may dynamically indicate a frequency domain resource to be used by the terminal.

Specifically, after the terminal hands over to the first frequency domain resource based on the first information, if the terminal receives DCI, the terminal receives, on the first frequency domain resource based on the first time domain resource allocation, a downlink data channel scheduled by the DCI.

Specifically, the network device may determine the first time domain resource allocation from the time domain resource allocations corresponding to all of the plurality of frequency domain resources in the first possible implementation and the second possible implementation, and then the network device sends, to the terminal, the first information used to indicate the terminal to hand over to the first frequency domain resource. In this way, the terminal may determine the time domain resource allocation corresponding to the first frequency domain resource as the first time domain resource allocation.

It should be noted that, if the network device determines that the first time domain resource allocation is the time domain resource allocation corresponding to the first frequency domain resource, the network device may send the time domain resource allocation corresponding to the first frequency domain resource to the terminal, and then send, to the terminal, the indication for handover to the first frequency domain resource.

In a possible implementation, the method provided in this embodiment of this application further includes; The terminal receives a downlink data channel based on the first time domain resource allocation.

This may specifically include: The terminal receives, based on the first time domain resource allocation and a time domain resource assignment field included in DCI, a downlink data channel scheduled by the DCI.

Specifically, the first time domain resource allocation in this embodiment of this application may include one or more time domain resource allocations. For example, if the first time domain resource allocation is shown in Table 2 or Table 3, the plurality of time domain resource allocations may be time domain resource allocations indicated by row indexes 0 to 16.

A first terminal determines a first index based on the time domain resource assignment field, determines, from the first time domain resource allocation based on the first index, a time domain resource allocation corresponding to the first index, and receives, based on a slot offset, a start symbol, and a length that are included in the time domain resource allocation corresponding to the first index, a downlink data channel scheduled by first DCI.

In conclusion, Embodiment 1 mainly describes a process of obtaining the first time domain resource allocation by the terminal. When the terminal has two or more time domain resource allocations (for example, the first time domain resource allocation and the second time domain resource allocation), the terminal may further determine, based on Embodiment 2, a time domain resource allocation to be used to receive the downlink data channel sent by the network device. For details, refer to descriptions in Embodiment 2. Details are not described herein. That is, Embodiment 1 and Embodiment 2 may be used in combination, or Embodiment 1 and Embodiment 2 may be implemented separately.

Embodiment 2

Figure 11:
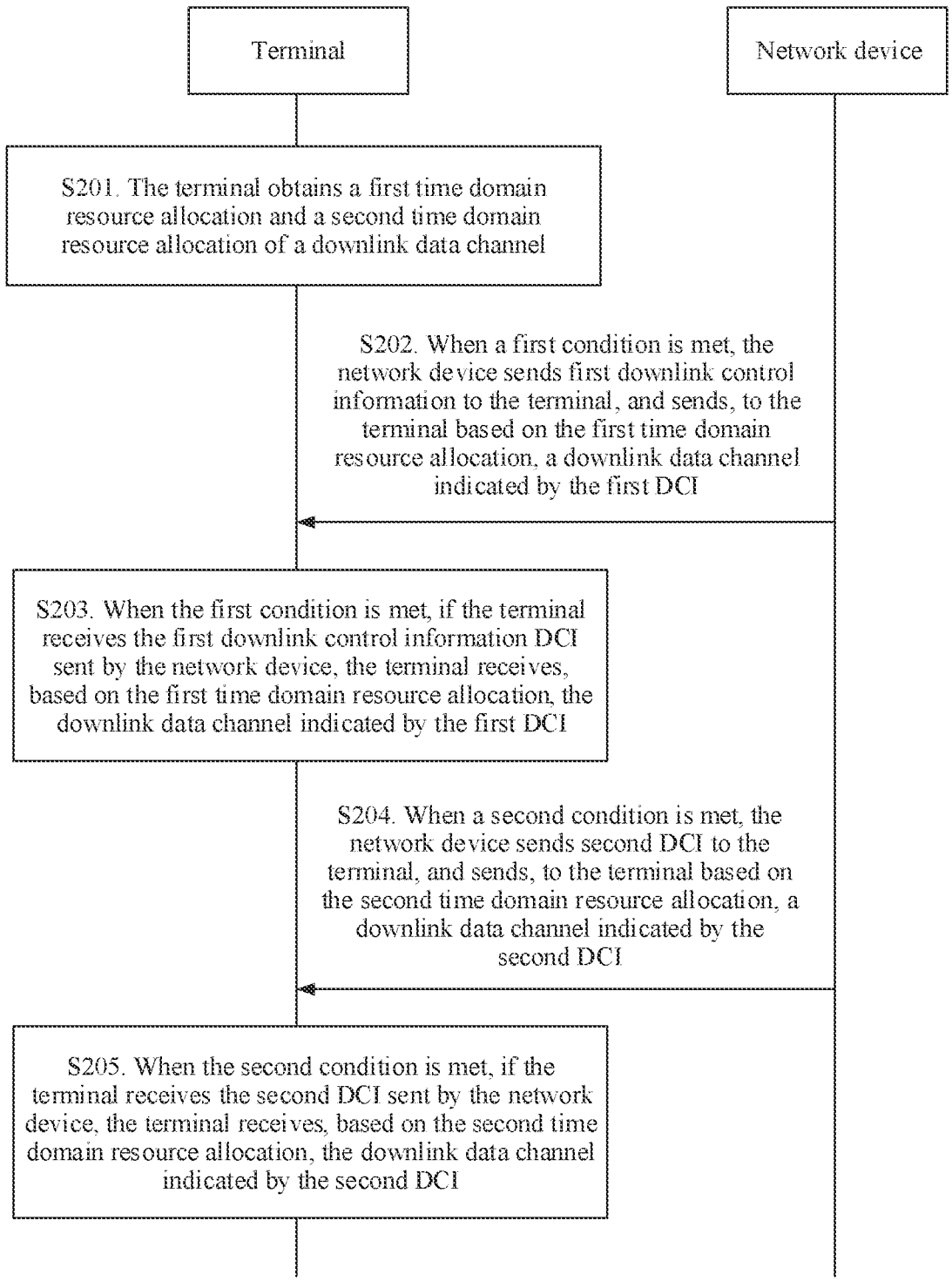
FIG. 11 is a schematic diagram of a communication process of receiving a downlink data channel according to an embodiment of this application.

As shown in FIG. 11, an embodiment of this application provides a downlink data channel receiving method. The method includes the following steps.

S201. A terminal obtains a first time domain resource allocation and a second time domain resource allocation of a downlink data channel, where the second time domain resource allocation is different from the first time domain resource allocation.

In a possible implementation, the terminal may obtain the first time domain resource allocation and the second time domain resource allocation from a network device. For a specific process, refer to the description in Embodiment 1.

In another possible implementation, the terminal may obtain the first time domain resource allocation and the second time domain resource allocation from a predefined time domain resource allocation, for example, a PDSCH time domain resource allocation table defined in a standard protocol, or a PDSCH time domain resource allocation corresponding to each row in the PDSCH time domain resource allocation table defined in the standard protocol.

In still another possible implementation, the terminal obtains one of the first time domain resource allocation and the second time domain resource allocation from a predefined time domain resource allocation, and obtains the other of the first time domain resource allocation and the second time domain resource allocation from the network device.

In this embodiment of this application, for a process in which the terminal obtains the first time domain resource allocation and/or the second time domain resource allocation from the network device, refer to related descriptions in Embodiment 1. Details are not described herein again.

For example, a time domain offset indicated by the second time domain resource allocation is different from a time domain offset indicated by the first time domain resource allocation. Specifically, power consumption generated when the terminal receives the downlink data channel by using the first time domain resource allocation is less than power consumption generated when the terminal receives the downlink data channel by using the second time domain resource allocation.

For example, the time domain offset indicated by the first time domain resource allocation is greater than the time domain offset indicated by the second time domain resource allocation.

For example, the time domain offset indicated by the first time domain resource allocation includes a slot offset 1 and the third symbol serving as a start symbol, and the time domain offset indicated by the second time domain resource allocation includes a slot offset 0 and the second symbol serving as a start symbol.

S202. When a first condition is met, the network device sends first downlink control information to the terminal, and sends, to the terminal based on the first time domain resource allocation, a downlink data channel scheduled by the first DCI, where the first condition includes: a first timer is not running.

A timer in this embodiment of this application is applicable to the following descriptions: Once the timer is started, the timer runs until the timer stops or expires. When the timer is not started, the timer is not running. If the timer is not running, the timer may be started. If the timer is running, the timer may be restarted. A value of the timer is an initial value of the timer when the timer is started or restarted. A time length of the timer may be understood as a time length from a moment at which the timer is started to continuously run to a moment at which the timer expires, or a time length from a moment at which the timer is restarted to continuously run to a moment at which the timer expires.

S203. When the first condition is met, if the terminal receives the first downlink control information DCI sent by the network device, the terminal receives, based on the first time domain resource allocation, the downlink data channel scheduled by the first DCI.

For example, the time domain offset indicated by the first time domain resource allocation is one slot. When the first condition is met, if the network device sends the first DCI in a slot 0, the terminal receives, in a slot 1, the downlink data channel scheduled by the first DCI.

That the terminal receives, based on the first time domain resource allocation, the downlink data channel scheduled by the first DCI may include: The terminal receives, based on the first time domain resource allocation and a time domain resource assignment field included in the first DCI, the downlink data channel scheduled by the first DCI.

Specifically, in this embodiment of this application, when a time domain resource allocation A may include a plurality of time domain resource allocations, the time domain resource allocation A may be in the form of a table or a category. For example, if the first time domain resource allocation is shown in Table 2 or Table 3, the plurality of time domain resource allocations may be time domain resource allocations indicated by row indexes 0 to 16.

A first terminal determines a first index based on the time domain resource assignment field, determines, from the first time domain resource allocation based on the first index, a time domain resource allocation corresponding to the first index, and receives, based on a slot offset, a start symbol, and a length that are included in the time domain resource allocation corresponding to the first index, the downlink data channel scheduled by the first DCI.

S204. When a second condition is met, the network device sends second DCI to the terminal, and sends, to the terminal based on the second time domain resource allocation, a downlink data channel indicated by the second DCI, where the second condition includes: the first timer is running.

S205. When the second condition is met, if the terminal receives the second DCI sent by the network device, the terminal receives, based on the second time domain resource allocation, the downlink data channel scheduled by the second DCI, where the second condition includes: the first timer is running.

For example, the time domain offset indicated by the first time domain resource allocation is zero slots. When the second condition is met, if the network device sends the second DCI in a slot 0, the terminal receives, in the slot 0, the downlink data channel scheduled by the first DCI.

For example, the first timer is used to determine a time length for which the terminal monitors a downlink control channel after receiving the downlink control channel. For example, the first timer is a DRX-inactivity timer (DRX-Inactivity Timer).

The terminal may start or restart the first timer in any one of the following trigger conditions:

Example 2-1: When the terminal receives a downlink control channel, the terminal starts or restarts the first timer.

Example 2-2: When the terminal receives a downlink control channel indicating data transmission, the terminal starts or restarts the first timer.

The downlink control channel indicating data transmission may be a downlink control channel indicating initial transmission, or may be a downlink control channel indicating retransmission.

Retransmission in this embodiment of this application means that data A is sent again after the data A fails to be sent. Initial transmission means that data is sent to a receiver for the first time, and may mean that data B is sent to the receiver after data A is successfully sent.

Example 2-3: When the terminal receives a downlink control channel indicating initial transmission, the terminal starts or restarts the first timer.

For example, if a second timer is started or restarted, the terminal starts or restarts the first timer. The second timer is used to determine a time length for which the terminal monitors the downlink control channel indicating initial transmission after receiving the downlink control channel indicating initial transmission. For example, the second timer is a DRX-inactivity timer.

Figure 12:
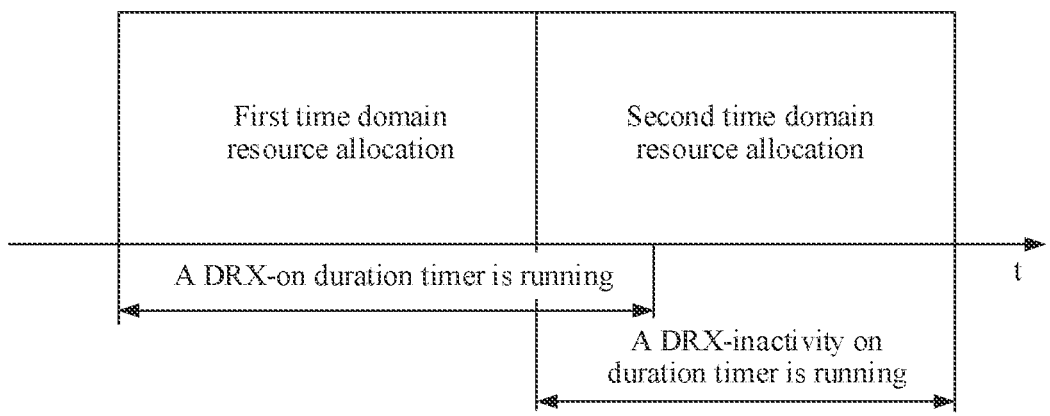
FIG. 12 is a schematic diagram of a running state of a timer according to an embodiment of this application.

In a possible implementation, as shown in FIG. 12, the first condition further includes: a second timer is running. The second timer is used to determine a time length for which the terminal monitors a downlink control channel in a discontinuous reception DRX cycle. For example, the second timer is a DRX on duration timer (DRX-onDurationTimer or on DurationTimer).

In another possible implementation, the first condition further includes one or more of the following cases: a downlink retransmission timer is not running an uplink retransmission timer is not running; a contention resolution timer is not running; a scheduling request (Scheduling Request, SR) sent by the terminal is not pending; and the terminal receives a downlink control channel indicating initial transmission after successfully receiving a RAR. The downlink control channel indicating initial transmission is scrambled by using a first identifier, and the first identifier is used to identify the terminal in a cell accessed by the terminal in a random access procedure. The RAR is a response to a target random access preamble, and the target random access preamble is not a contention-based random access preamble.

For example, the first identifier is a C-RNTI.

In a possible implementation, the method provided in this embodiment of this application further includes: In a third condition, the network device sends the second DCI to the terminal, and sends, to the terminal based on the second time domain resource allocation, the downlink data channel scheduled by the second DCI. In addition, in the third condition, the terminal receives the second DCI sent by the network device, and the terminal receives, based on the second time domain resource allocation, the downlink data channel scheduled by the second DCI.

For example, the third condition includes one or more of the following: the downlink retransmission timer is running, the uplink retransmission timer is running; the contention resolution timer is running; the scheduling request sent by the terminal is pending; and the terminal does not receive the downlink control channel indicating initial transmission after successfully receiving the random access response RAR. The downlink control channel indicating initial transmission is scrambled by using the first identifier, the RAR is a response to the target random access preamble, and the target random access preamble is not a contention-based random access preamble.

In the embodiments of this application, the terminal may perform the methods described in Embodiment 1 and Embodiment 2 in an SCell, a default BWP, or an initial BWP (which may also be referred to as an initially activated BWP).

The foregoing mainly describes the solutions in the embodiments of this application from a perspective of interaction between network elements. It can be understood that to implement the foregoing functions, the network elements such as a communications apparatus include corresponding hardware structures and/or software modules for executing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function units based on the foregoing method examples. For example, each function unit may be obtained through division based on a corresponding function, or two or more functions may be integrated into one processing unit. The integrated unit may be implemented in the form of hardware, or may be implemented in the form of a software function unit. It should be noted that, in the embodiments of this application, division into the units is an example, and is merely logical function division. In an actual implementation, another division manner may be used.

Descriptions are provided below by using an example in which function modules are obtained through division based on corresponding functions.

Figure 13:
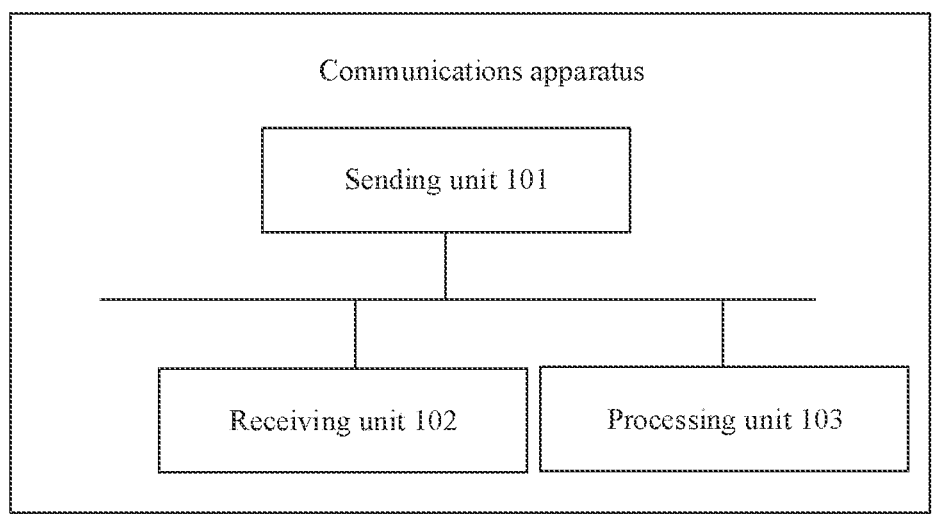
FIG. 13 is a schematic structural diagram 1 of a communications apparatus according to an embodiment of this application.

When an integrated unit is used, FIG. 13 is a possible schematic structural diagram of a communications apparatus in the foregoing embodiments. The communications apparatus may be a terminal or a chip applied to the terminal. The communications apparatus includes a sending unit 101 and a receiving unit 102. Optionally, the communications apparatus may further include a processing unit 103.

In a possible implementation, the sending unit 101 is configured to support the communications apparatus in performing S101 in the foregoing embodiments. The receiving unit 102 is configured to support the communications apparatus in performing S104 in the foregoing embodiments. The processing unit 103 is configured to support the communications apparatus in performing S106, S107, and S109 in the foregoing embodiments.

In another possible implementation, when the terminal independently performs the steps in Embodiment 2, the communications apparatus may not include the sending unit 101. In this case, the processing unit 103 is configured to support the communications apparatus in performing S201 in the foregoing embodiments. The receiving unit 102 is configured to support the communications apparatus in performing S203 and S205 in the foregoing embodiments.

All related content of the steps in the foregoing method embodiments may be cited in function descriptions of the corresponding function modules. Details are not described herein again.

Figure 14:
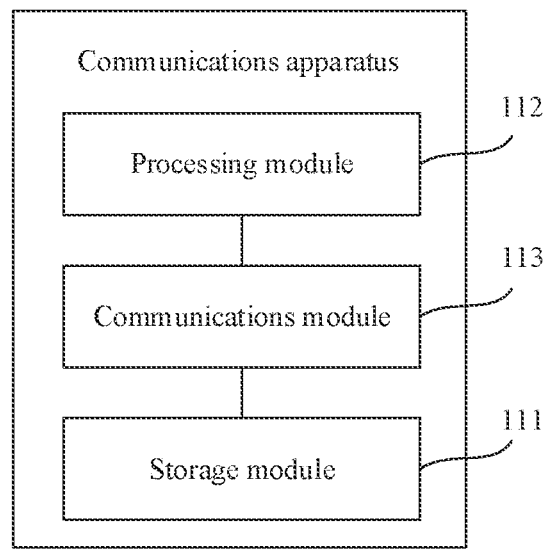
FIG. 14 is a schematic structural diagram 2 of a communications apparatus according to an embodiment of this application.

When an integrated unit is used, FIG. 14 is a possible schematic structural diagram of a communications apparatus in the foregoing embodiments. The communications apparatus may be a terminal or a chip applied to the terminal. The communications apparatus includes a processing module 112 and a communications module 113. Optionally, the communications apparatus may further include a storage module 111, configured to store program code and data of the communications apparatus.

The processing module 112 is configured to control and manage an action of the communications apparatus. For example, the processing module 112 is configured to perform a message or data processing step on a communications apparatus side. The communications module 113 is configured to perform a message or data processing step on the communications apparatus side.

In a possible implementation, the communications module 113 is configured to support the communications apparatus in performing S101 and S104 in the foregoing embodiments. The processing module 112 is configured to support the communications apparatus in performing S106, S107, and S109 in the foregoing embodiments.

In another possible implementation, the processing module 112 is configured to support the communications apparatus in performing S201 and determining whether the first condition/the second condition is met in S203 and S205 in the foregoing embodiments. The communications module 113 is configured to support the communications apparatus in performing an information/downlink data channel receiving process in S203 and S205 in the foregoing embodiments.

The processing module 112 may be a processor or a controller. For example, the processing module 112 may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a communications interface, a transceiver, a transceiver circuit, an interface circuit, or the like. The storage module 111 may be a memory.

When the processing module 112 is the processor 1211, the communications module 113 is the interface circuit or transceiver 1212, and the storage module 111 is the memory 1213, the communications apparatus in this application may be the device shown in FIG. 6.

For example, the transceiver 1212 supports a communications apparatus in performing S101 and S104. The processor 1211 is configured to support the communications apparatus in executing program code and data that are stored in the memory 1213, to implement S106, S107, and S109 provided in this application.

In another example, the transceiver 1212 supports a communications apparatus in performing an information/downlink data channel receiving process in S203 and S205. The processor 1211 is configured to support the communications apparatus in executing program code and data that are stored in the memory 1213, to implement S201 and determine whether the first condition/second condition is met in S203 and S205 provided in this application.

Figure 15:
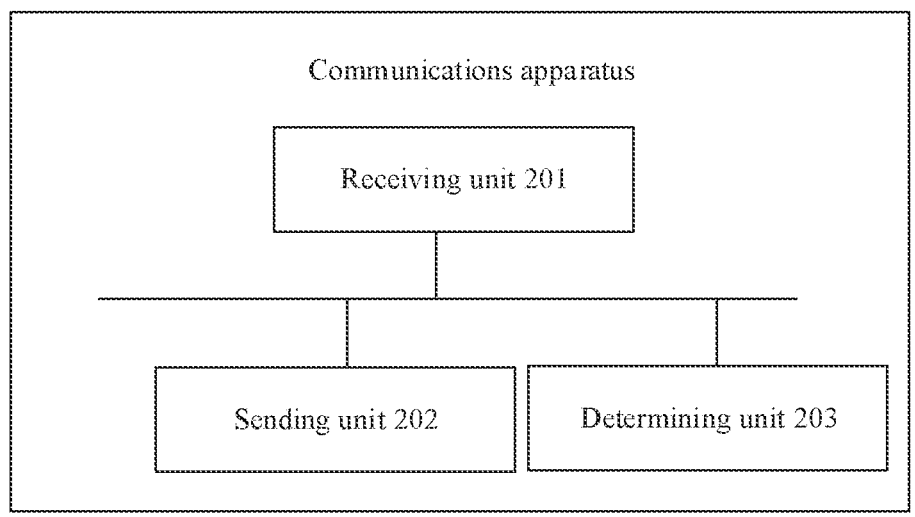
FIG. 15 is a schematic structural diagram 3 of a communications apparatus according to an embodiment of this application.

When an integrated unit is used, FIG. 15 is a possible schematic structural diagram of a communications apparatus in the foregoing embodiments. The communications apparatus may be a network device or a chip applied to the network device. The communications apparatus includes a receiving unit 201 and a sending unit 202. Optionally, the communications apparatus may further include a determining unit 203.

In a possible implementation, the receiving unit 201 is configured to support the communications apparatus in performing S102 in the foregoing embodiments. The sending unit 202 is configured to support the communications apparatus in performing S103 and S105 in the foregoing embodiments. The determining unit 203 is configured to support the communications apparatus in performing S108 in the foregoing embodiments.

In another possible implementation, when the network device independently performs the steps in Embodiment 2, the communications apparatus may not include the receiving unit 201. In this case, the determining unit 203 is configured to support the communications apparatus in determining whether the first condition and the second condition are met in S202 and S204 in the foregoing embodiments. The sending unit 202 is configured to support the communications apparatus in sending a message or data in S202 and S204 in the foregoing embodiments.

All related content of the steps in the foregoing method embodiments may be cited in function descriptions of the corresponding function modules. Details are not described herein again.

Figure 16:
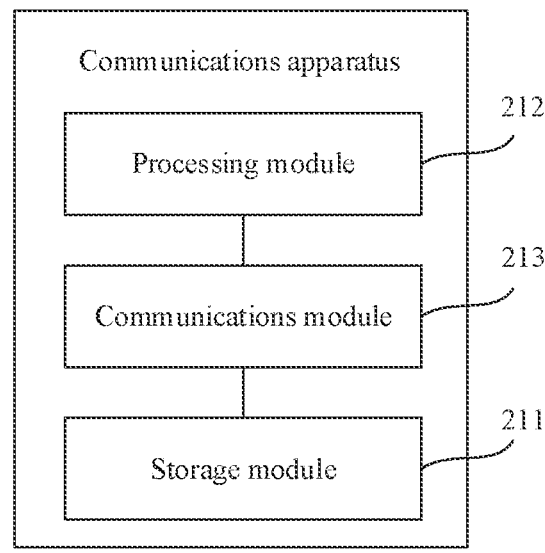
FIG. 16 is a schematic structural diagram 4 of a communications apparatus according to an embodiment of this application.

When an integrated unit is used, FIG. 16 is a possible schematic structural diagram of a communications apparatus in the foregoing embodiments. The communications apparatus may be a network device or a chip applied to the network device. The communications apparatus includes a processing module 212 and a communications module 213. Optionally, the communications apparatus may further include a storage module 211, configured to store program code and data of the communications apparatus.

The processing module 212 is configured to control and manage an action of the communications apparatus. For example, the processing module 212 is configured to perform a message or data processing step on a communications apparatus side. The communications module 213 is configured to perform a message or data processing step on the communications apparatus side.

In a possible implementation, the communications module 213 is configured to support the communications apparatus in performing S103 and S105 in the foregoing embodiments. The processing module 212 is configured to support the communications apparatus in performing S108 in the foregoing embodiments.

In another possible implementation, the processing module 212 is configured to support the communications apparatus in determining whether the first condition and the second condition are met in S202 and S204 in the foregoing embodiments. The communications module 213 is configured to support the communications apparatus in sending message or data in S202 and S204 in the foregoing embodiments.

The processing module 212 may be a processor or a controller. For example, the processing module 212 may be a central processing unit, a general purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 113 may be a communications interface, a transceiver, a transceiver circuit, an interface circuit, or the like. The storage module 211 may be a memory.

When the processing module 212 is the processor 1111, the communications module 213 is the interface circuit or transceiver 1113, and the storage module 211 is the memory 1112, the communications apparatus in this application may be the device shown in FIG. 5.

For example, the transceiver 1113 supports a communications apparatus in performing S101 and S104. The processor 1111 is configured to support the communications apparatus in executing program code and data that are stored in the memory 1112, to implement S108 provided in this application.

In another example, the transceiver 1113 supports a communications apparatus in sending a message or data in S202 and S204 in the foregoing embodiments. The processor 1111 is configured to support the communications apparatus in performing a process of determining whether the first condition and the second condition are met and a process of determining whether the third condition is met in S202 and S204 in the foregoing embodiments.

It should be noted that, in the embodiments of this application, the receiving unit or the processing unit (or a unit used for receiving/obtaining) is an interface circuit of the apparatus, and is configured to receive a signal from another apparatus. For example, when the apparatus is implemented through a chip, the receiving unit is an interface circuit that is of the chip and that is configured to receive a signal from another chip or apparatus. The sending unit or transmission unit (or a unit used for sending/transmission) is an interface circuit of the apparatus, and is configured to send a signal to another apparatus. For example, when the apparatus is implemented through a chip, the sending unit is an interface circuit that is of the chip and that is configured to send a signal to another chip or apparatus. The processing unit or the determining unit in the embodiments of this application is a processor of the apparatus, and is configured to process a received signal or process a signal of the apparatus. For example, when the apparatus is implemented through a chip, the processing unit or the determining unit is a processor that is of the chip and that is configured to process a signal received from another chip or apparatus.

Figure 17:
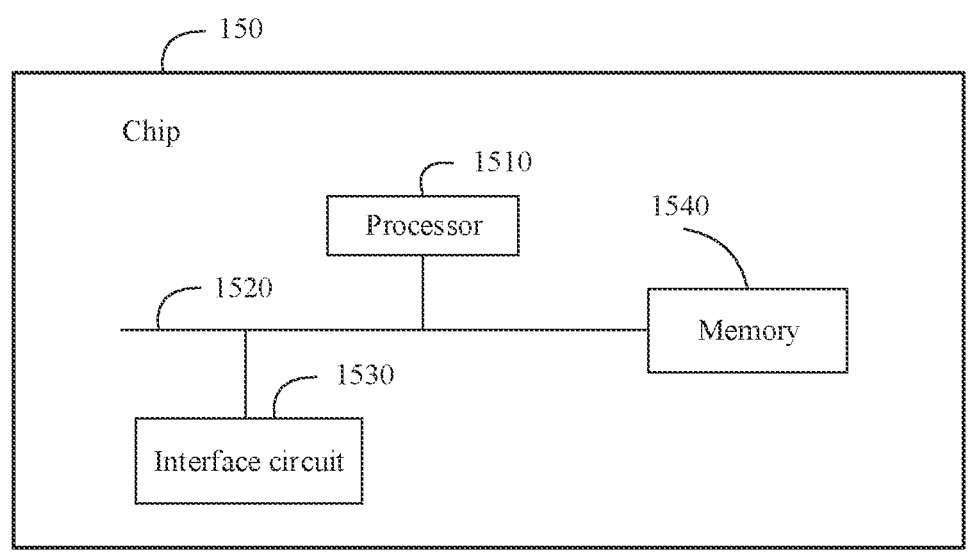
FIG. 17 is a schematic structural diagram of a chip according to an embodiment of this application.

FIG. 17 is a schematic structural diagram of a chip 150 according to an embodiment of the present invention. The chip 150 includes one or more (including two) processors 1510 and an interface circuit 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (non-volatile random access memory, NVRAM).

In some implementations, the memory 1540 stores the following elements, an executable module or a data structure, or a subset thereof, or an extended set thereof:

In this embodiment of the present invention, a corresponding operation is performed by invoking the operation instruction stored in the memory 1540 (the operation instruction may be stored in an operating system).

In a possible implementation, the communications apparatuses use a similar chip structure, and different apparatuses may use different chips to implement respective functions.

The processor 1510 controls operations of the communications apparatuses. The processor 1510 may also be referred to as a central processing unit (central processing unit, CPU). The memory 1540 may include a read-only memory and a random access memory, and provide an instruction and data to the processor 1510. A part of the memory 1540 may further include a non-volatile random access memory (non-volatile random access memory, NVRAM). For example, during application, the memory 1540, the interface circuit 1530, and the memory 1540 are coupled together by using a bus system 1520. The bus system 1520 may further include a power bus, a control bus, a status signal bus, and the like in addition to a data bus. However, for clear description, various types of buses in FIG. 17 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, steps in the foregoing methods can be implemented by using a hardware integrated logical circuit in the processor 1510, or by using instructions in the form of software. The processor 1510 may be a general purpose processor, a digital signal processor (digital signal processor, DSP), an application specific integrated circuit (application specific integrated circuit, ASIC), a field-programmable gate array (field-programmable gate array, FPGA) or another programmable logic device, a discrete gate or transistor logic device, or a discrete hardware component. It may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor.

In a possible implementation, the interface circuit 1530 is configured to perform receiving and sending steps of the terminal and the network device in the embodiments shown in FIG. 8, FIG. 9, FIG. 10, and FIG. 11. The processor 1510 is configured to perform processing steps of the terminal and the network device in the embodiments shown in FIG. 8, FIG. 9, FIG. 10, and FIG. 11.

In the foregoing embodiments, the instruction that is stored in the memory and that is to be executed by the processor may be implemented in the form of a computer program product. The computer program product may be written into the memory in advance, or may be downloaded and installed in the memory in the form of software.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium that can be stored in the computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive solid state disk, SSD), or the like.

According to one aspect, a computer readable storage medium is provided. The computer readable storage medium stores an instruction. When the instruction is run, a terminal or a chip applied to the terminal is enabled to perform S101, S104, S106, S107, and S109 in the embodiments.

According to another aspect, a computer readable storage medium is provided. The computer readable storage medium stores an instruction. When the instruction is run, a terminal or a chip applied to the terminal is enabled to perform S201, S203, and S205 in the embodiments.

According to still another aspect, a computer readable storage medium is provided. The computer readable storage medium stores an instruction. When the instruction is run, a network device or a chip applied to the network device is enabled to perform S103, S105, and S108 in the embodiments, and/or is configured to perform another process performed by the network device or the chip applied to the network device in the technology described in this specification.

According to yet another aspect, a computer readable storage medium is provided. The computer readable storage medium stores an instruction. When the instruction is run, a network device or a chip applied to the network device is enabled to perform S202 and S204 in the embodiments.

The foregoing readable storage medium may include: any medium that can store program code, such as a removable hard disk, a read-only memory, a random access memory, a magnetic disk, or an optical disc.

According to one aspect, a computer program product including an instruction is provided. The computer program product stores the instruction. When the instruction is run, a terminal or a chip applied to the terminal is enabled to perform S101, S104, S106, S107, and S109 in the embodiments, and/or is configured to perform another process performed by the terminal or the chip applied to the terminal in the technology described in this specification.

According to another aspect, a computer program product including an instruction is provided. The computer program product stores an instruction. When the instruction is run, a network device or a chip applied to the network device is enabled to perform steps S103, S105, and S108 in the embodiments, and/or is configured to perform another process performed by the network device or the chip applied to the network device in the technology described in this specification.

According to another aspect, a computer program product including an instruction is provided. The computer program product stores an instruction. When the instruction is run, a network device or a chip applied to the network device is enabled to perform steps S202 and S204 in the embodiments, and/or is configured to perform another process performed by the network device or the chip applied to the network device in the technology described in this specification.

All or some of the foregoing embodiments may be implemented by using software, hardware, firmware, or any combination thereof. When a software program is used to implement the embodiments, the embodiments may be implemented completely or partially in the form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clearly that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communications method, comprising:
   receiving first information, wherein the first information is in a Radio Resource Control (RRC) message or in second downlink control information (DCI) and comprises information that indicates a first time domain offset, and the first time domain offset is a minimum time domain offset that is larger than zero;
   receiving first DCI, wherein the first DCI comprises a time domain resource assignment field that indicates a time domain position of a first downlink data channel scheduled by the first DCI;

determining, based at least on the time domain resource assignment field, a second time domain offset of the first downlink data channel scheduled by the first DCI relative to a time domain position of the first DCI that schedules the first downlink data channel, wherein the first time domain offset is smaller than or equal to the second time domain offset; and receiving, based on the second time domain offset, the first downlink data channel, wherein the method further comprises: sending information used to indicate a third time domain offset, wherein the third time domain offset is the minimum time domain offset and indicates a slot offset between a time domain position of a downlink data channel and a time domain position of DCI for scheduling the downlink data channel expected by a user equipment (UE).

2. The communications method according to claim 1,
wherein the determining, based at least on the time domain resource assignment field, a second time domain offset comprises:

determining, based on the first time domain offset and the time domain resource assignment field, the second time domain offset.

3. The communications method according to claim 2, wherein the sending information used to indicate a third time domain offset comprises:

sending UE assistance information, wherein the UE assistance information comprises the information used to indicate the third time domain offset.

4. The communications method according to claim 2, wherein the first time domain offset is greater than or equal to the third time domain offset.

5. The communications method according to claim 1, wherein the determining, based at least on the time domain resource assignment field, a second time domain offset of the first downlink data channel scheduled by the first DCI relative to a time domain position of the first DCI that schedules the first downlink data channel, wherein the first time domain offset is smaller or equal than the second time domain offset comprises:

determining an index based on the time domain resource assignment field; and determining, based on the index, a time domain resource allocation from one or more time domain resource allocations, wherein the time domain resource allocation is corresponding to the index and comprises the second time domain offset of the first downlink data channel scheduled by the first DCI.

6. The communications method according to claim 5, wherein the one or more time domain resource allocations are comprised in a time domain resource allocation list, wherein the time domain resource allocation list is configured by using Radio Resource Control (RRC) signaling.

7. The communications method according to claim 5, wherein the one or more time domain resource allocations are in a time domain resource allocation table.

8. The communications method according to claim 1, wherein the second time domain offset of the first downlink data channel scheduled by the first DCI is relative to a timeslot in which the first DCI is located, wherein the first downlink data channel is a physical downlink shared channel.

9. A communications method, comprising:
sending first information, wherein the first information is in a Radio Resource Control (RRC) message or in second downlink control information (DCI) and comprises information that indicates a first time domain offset, and the first time domain offset is a minimum time domain offset that is larger than zero;

sending first downlink control information (DCI), wherein the first DCI comprises a time domain resource assignment field that indicates a time domain position of a first downlink data channel scheduled by the first DCI, and the first DCI indicates a user equipment (UE) to determine, based at least on a time domain resource allocation domain comprised in the first DCI, a second time domain offset of the first downlink data channel scheduled by the first DCI relative to a time domain position of the first DCI that schedules the first downlink data channel, wherein the first time domain offset is smaller than or equal to the second time domain offset of the first downlink data channel scheduled by the first DCI; and sending the first downlink data channel, wherein the method further comprises: receiving information used to indicate a third time domain offset, wherein the third time domain offset is the minimum time domain offset and indicates a slot offset between a time domain position of a downlink data channel and a time domain position of DCI for scheduling the downlink data channel expected by the UE.

10. The communications method according to claim 9, wherein the second time domain offset of the first downlink data channel scheduled by the first DCI is relative to a timeslot in which the first DCI is located, wherein the first downlink data channel is a physical downlink shared channel.

11. The communications method according to claim 9,
wherein the first DCI indicates the UE to determine, based on-the first time domain offset and the time domain resource allocation domain comprised in the first DCI, the second time domain offset.

12. The communications method according to claim 11, wherein the receiving information used to indicate a third time domain offset comprises:

receiving UE assistance information, wherein the UE assistance information comprises the information used to indicate the third time domain offset.

13. The communications method according to claim 11, wherein the second time domain offset is greater than or equal to the third time domain offset.

14. A communication apparatus, comprising:
at least one processor; and
one or more memories coupled to the at least one processor and storing programming instructions for execution by the at least one processor to cause the communication apparatus to perform operations comprising:

receiving first information, wherein the first information is in a Radio Resource Control (RRC) message or in second downlink control information (DCI) and comprises information which indicates a first time domain offset, and the first time domain offset is a minimum time domain offset that is larger than zero;

receiving first DCI, wherein the first DCI comprises a time domain resource assignment field that indicates a time domain position of a first downlink data channel scheduled by the first DCI;

determining, based at least on the time domain resource assignment field, a second time domain offset of the first downlink data channel scheduled by the first DCI relative to a time domain position of the first DCI that schedules the first downlink data channel, wherein the first time domain offset is smaller or equal than the second time domain offset of the first downlink data channel scheduled by the first DCI; and receiving, based on the second time domain offset, the first downlink data channel, wherein the operations further comprise: sending information used to indicate a third time domain offset, wherein the third time domain offset is the minimum time domain offset and indicates a slot offset between a time domain position of a downlink data channel and a time domain position of DCI for scheduling the downlink data channel expected by the communication apparatus.

15. The communications apparatus according to claim 14, wherein the determining, based at least on the time domain resource assignment field, a second time domain offset comprises:

determining, based on the first time domain offset and the time domain resource assignment field, the second time domain offset.

16. The communications apparatus according to claim 15, wherein the second time domain offset is greater than or equal to the third time domain offset.

17. The communications apparatus according to claim 14, wherein the receiving, based on the second time domain offset, the first downlink data channel scheduled by the first DCI relative to a time domain position of the first DCI that schedules the first downlink data channel comprises:

determining an index based on the time domain resource assignment field; and determining, based on the index, a time domain resource allocation from one or more time domain resource allocations, wherein the time domain resource allocation is corresponding to the index and comprises the second time domain offset of the first downlink data channel scheduled by the first DCI.

18. The communications apparatus according to claim 17, wherein the one or more time domain resource allocations are comprised in a time domain resource allocation list, wherein the time domain resource allocation list is configured by using Radio Resource Control (RRC) signaling; or wherein the one or more time domain resource allocations are in a time domain resource allocation table.

19. The communications apparatus according to claim 14, wherein the second time domain offset of the first downlink data channel scheduled by the first DCI is relative to a timeslot in which the first DCI is located, wherein the first downlink data channel is a physical downlink shared channel.

* * * * *

UNITED STATES PATENT AND TRADEMARK OFFICE
CERTIFICATE OF CORRECTION

PATENT NO. : 12,289,728 B2
APPLICATION NO. : 17/276408
DATED : April 29, 2025
INVENTOR(S) : Yu Cai et al.

Page 1 of 1

It is certified that error appears in the above-identified patent and that said Letters Patent is hereby corrected as shown below:

In the Claims

In Column 64, In Line 34, In Claim 11, delete "on-the" and insert -- on the --.

Signed and Sealed this
Twenty-ninth Day of July, 2025

Coke Morgan Stewart
*Acting Director of the United States Patent and Trademark Office*